US010794046B2

(12) United States Patent
Imura et al.

(10) Patent No.: US 10,794,046 B2
(45) Date of Patent: Oct. 6, 2020

(54) WORK MACHINE

(71) Applicant: HITACHI CONSTRUCTION MACHINERY CO., LTD., Tokyo (JP)

(72) Inventors: Shinya Imura, Toride (JP); Kouji Ishikawa, Kasumigaura (JP); Hiroshi Sakamoto, Hitachi (JP); Yasuhiko Kanari, Kasumigaura (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 241 days.

(21) Appl. No.: 15/753,246

(22) PCT Filed: Sep. 16, 2016

(86) PCT No.: PCT/JP2016/077567
§ 371 (c)(1),
(2) Date: Feb. 16, 2018

(87) PCT Pub. No.: WO2018/051511
PCT Pub. Date: Mar. 22, 2018

(65) Prior Publication Data
US 2019/0226181 A1 Jul. 25, 2019

(51) Int. Cl.
*E02F 9/26* (2006.01)
*E02F 3/43* (2006.01)
*E02F 9/22* (2006.01)

(52) U.S. Cl.
CPC .............. *E02F 9/26* (2013.01); *E02F 3/43* (2013.01); *E02F 3/435* (2013.01); *E02F 9/2221* (2013.01); *B60Y 2200/412* (2013.01)

(58) Field of Classification Search
CPC ..... E02F 9/26; E02F 3/43; E02F 3/435; E02F 9/2221; B60Y 2200/412
See application file for complete search history.

(56) References Cited

U.S. PATENT DOCUMENTS

2013/0158787 A1* 6/2013 Nomura ............... E02F 9/264
701/34.4
2015/0308081 A1* 10/2015 Takaura ............... E02F 3/437
701/50

(Continued)

FOREIGN PATENT DOCUMENTS

JP 2002-167794 A 6/2002
WO 2015/194601 A1 12/2015

OTHER PUBLICATIONS

International Search Report of PCT/JP2016/077567 dated Dec. 20, 2016.

(Continued)

*Primary Examiner* — Sze-Hon Kong
(74) *Attorney, Agent, or Firm* — Mattingly & Malur, PC

(57) ABSTRACT

A hydraulic excavator (1) includes a controller (40) for generating, when the tip of a work implement (1A) is approaching a target surface (60) due to the pilot pressure output from an operating device (45a, 45b, 46a), a control signal for a boom cylinder (5) such that the tip of the work implement moves along the target surface and controlling the work implement (1A) by outputting the generated control signal to the flow control valve (15a) of the boom cylinder (5). The controller calculates the positional information of a finished shape (97) formed by the work implement, based on the topographic information input from a topographic measurement device (96) that measures the topography near the work machine and corrects the control signal based on the positional information of the finished shape such that the finished shape gets closer to the target surface.

5 Claims, 18 Drawing Sheets

(56) References Cited

U.S. PATENT DOCUMENTS

| | | | |
|---|---|---|---|
| 2016/0010312 A1* | 1/2016 | Kurihara | E02F 3/435 |
| | | | 701/36 |
| 2016/0265186 A1* | 9/2016 | Kami | E02F 9/2228 |
| 2016/0273186 A1* | 9/2016 | Kami | E02F 3/435 |
| 2017/0101761 A1* | 4/2017 | Wu | E02F 9/20 |
| 2017/0284070 A1* | 10/2017 | Matsuyama | E02F 9/20 |
| 2018/0245311 A1* | 8/2018 | Shike | G01C 11/06 |
| 2019/0028676 A1* | 1/2019 | Koga | G06Q 10/06 |
| 2019/0078294 A1* | 3/2019 | Nagato | E02F 9/2004 |

OTHER PUBLICATIONS

International Preliminary Report on Patentability received in corresponding International Application No. PCT/JP2016/077567 dated Mar. 28, 2019.

* cited by examiner

FIG. 20

(1) BUCKET CLAW TIP ENTERS TARGET SURFACE AND VERTICAL COMPONENT by FACES DOWNWARD

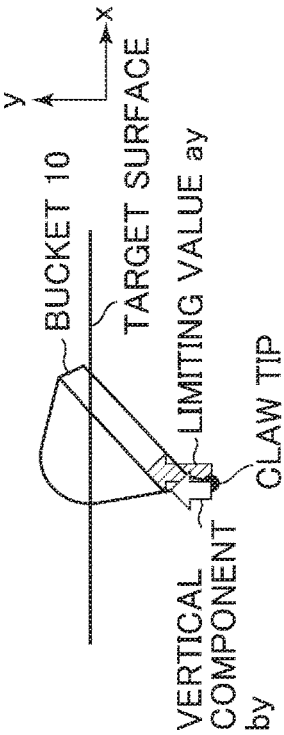

USE LIMITING VALUE ay AS ty (2) BUCKET CLAW TIP ENTERS TARGET SURFACE AND VERTICAL COMPONENT by FACES UPWARD

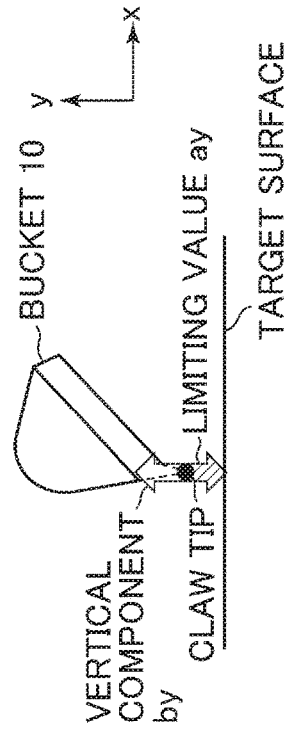

USE ONE WITH LARGER ABSOLUTE VALUE AS ty (IN THIS CASE, LIMITING VALUE ay)

(3) BUCKET CLAW TIP IS ABOVE TARGET SURFACE AND VERTICAL COMPONENT by FACES DOWNWARD

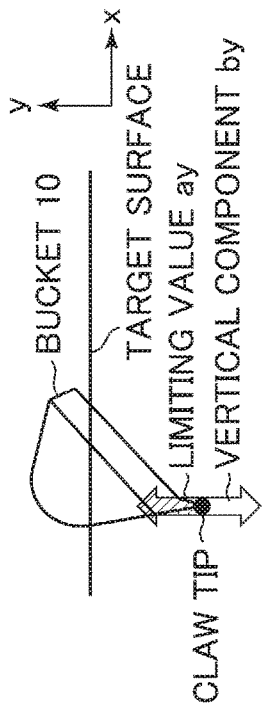

USE ONE WITH SMALLER ABSOLUTE VALUE AS ty (IN THIS CASE, LIMITING VALUE ay)

(4) BUCKET CLAW TIP IS ABOVE TARGET SURFACE AND VERTICAL COMPONENT by FACES UPWARD

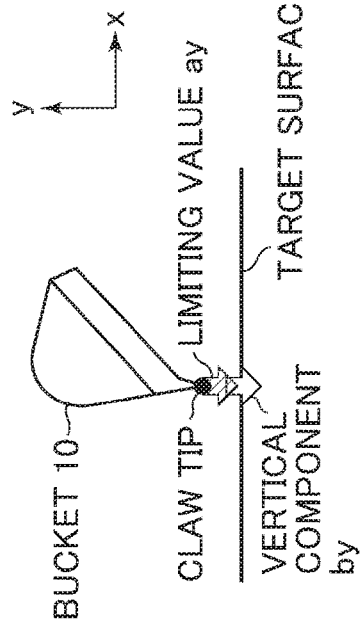

USE VERTICAL COMPONENT by AS ty

WORK MACHINE

TECHNICAL FIELD

The present invention relates to a work machine capable of area limiting control.

BACKGROUND OF THE INVENTION

Some hydraulic excavators include a control system that assists the operator in performing an excavation operation. Specifically, there is a control system that performs control to forcibly operate at least the boom cylinder (e.g., the boom cylinder is expanded to forcibly perform boom raising) among the boom cylinder, the arm cylinder, and bucket cylinder that drive the work implement based on the positional relation between a target surface and the tip of the work implement (e.g., the claw tip of the bucket) such that the tip of the work implement is maintained on or above the target surface when an excavation operation (e.g., an instruction for arm crowding) is input through an operating device. By using such a control system as limits the area in which the tip of the work implement can move, leveling of the excavation surface and forming of slopes can be done more easily. Hereinafter, such control is referred to also as 'area limiting control' or 'machine control.'

In relation to the above technology, Patent Document 1 discloses a hydraulic excavator that calculates the position of the bucket tip based on the pivot angle information output from angle sensors attached to the boom, the arm, and the bucket and controls the boom such that when the bucket tip is located near the boundary (target surface) of a predetermined area, the vertical speed component of the bucket tip decreases as the bucket tip and the boundary get closer to each other.

PRIOR ART DOCUMENT

Patent Document

Patent Document 1: JP-2002-167794-A

SUMMARY OF THE INVENTION

Problem to be Solved by the Invention

However, in performing area limiting control, when the position of the bucket tip is calculated based on the information of the angle sensors of the boom, the arm, and the bucket as in Patent Document 1, the accuracy of the calculation depends on the detection accuracy of the angle sensors. As a result, the accuracy of controlling the bucket claw tip based on area limiting control also depends of the detection accuracy of the angle sensors. If the accuracy of the angle sensors is not sufficient, the accuracy of construction a target surface cannot be enhanced.

In area limiting control, target speeds for the hydraulic cylinders may be calculated, and the target speeds are converted into pilot pressures (control signals) for the flow control valves of the hydraulic cylinders. However, where there are differences between the characteristics of a conversion table used to convert target speeds into pilot pressures and the characteristics of the actual devices such as hydraulic cylinders and flow control valves, the accuracy of controlling the bucket claw tip decrease. Also, a pilot pressure calculated in the above process may occasionally be generated by the variable throttle of a solenoid proportional valve. If the control accuracy of the solenoid proportional valve is not sufficient, the calculated pilot pressure cannot be generated, reducing the control accuracy of the bucket claw tip.

Further, when a movable part is loosened due to aged deterioration or the like, applying continuously the same control as at the time of shipment results in differences between the operation of the movable part assumed by the control and the actual operation, which reduces the control accuracy of the bucket claw tip. The same applies when there are individual differences between work machines.

As described above, in area limiting control, the control accuracy of the tip of the work implement may decrease due to various errors and the accumulation of errors, which in turn decrease the accuracy of constructing a target surface.

An object of the invention is to provide a work machine capable of performing area limiting control and enhancing the accuracy of constructing a target surface even if the detection accuracy of sensors and the accuracy of controlling the tip of the work implement are not sufficient.

Means for Solving the Problem

The invention includes multiple means for solving the above problems, one of which is a work machine including: a multi-joint work implement including a boom, an arm, and a bucket; a boom cylinder, an arm cylinder, and a bucket cylinder for driving the boom, the arm, and the bucket, respectively; an operating device for outputting a first control signal that matches an input by an operator to at least one of flow control valves of the boom cylinder, the arm cylinder, and the bucket cylinder; and a controller including a control signal calculating section for newly generating a second control signal or generating the second control signal by correcting the first control signal, the second control signal being used to operate at least one of the boom cylinder, the arm cylinder, and the bucket cylinder such that when a tip of the work implement is approaching a target surface by the first control signal, the tip of the work implement moves along the target surface, the controller controlling the flow control valves of the boom cylinder, the arm cylinder, and the bucket cylinder based on the first signal or the second control signal. The controller further includes a topography calculating section for calculating, based on topographic information input from a topographic measurement device that measures topography near the work implement, the positional information of a finished shape formed by the work implement driven based on the second control signal. The control signal calculating section corrects the second control signal based on the positional information of the finished shape such that the finished shape gets closer to the target surface.

Advantages of the Invention

In accordance with the invention, the accuracy of constructing a target surface can be enhanced.

BRIEF DESCRIPTION OF DRAWINGS

FIG. 20 illustrates how the vertical component ty of a target speed vector T differs when the position of the claw tip with respect to the target surface and a vertical component by vary;

MODES FOR CARRYING OUT THE INVENTION

Embodiments of the present invention will now be described with reference to the accompanying drawings. In the explanation that follows, we describe a hydraulic excavator having a bucket 10 as an attachment to be installed at the tip of its work implement. Note, however, that the invention can also be applied to hydraulic excavators with any attachments other than the bucket. The invention can further be applied to any work machine other than hydraulic excavators as long as it has a multi-joint work implement that includes mutually connected drivable members (attachment, arm, boom, and the like) and operates in a predetermined operation plane.

As for the words 'on,' 'above,' and 'below' used together with a word describing a certain shape (for example, a target surface or a surface to be controlled) in this specification, 'on' means 'on a surface' of the certain shape, 'above' means 'at a position higher than a surface' of the certain shape, and 'below' means 'at a position lower than a surface' of the certain shape. Also, in the explanation that follows, when multiple elements of the same type are present, their numerals are or are not followed by alphabet letters. For example, when three pumps 300$a$, 300$b$, and 300$c$ are present, they can also be called, collectively, the pumps 300.

EMBODIMENT 1

Figure 1:
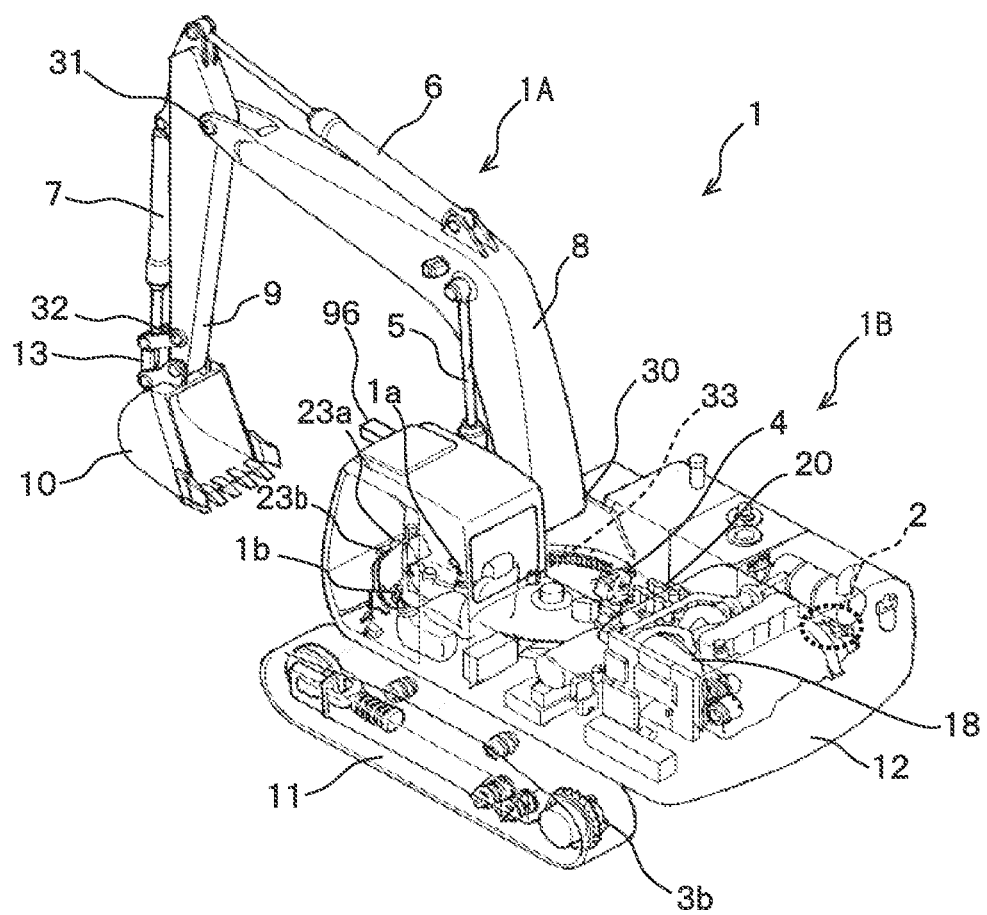
FIG. 1 is a diagram illustrating a hydraulic excavator according to Embodiment 1 of the invention.
Figure 2:
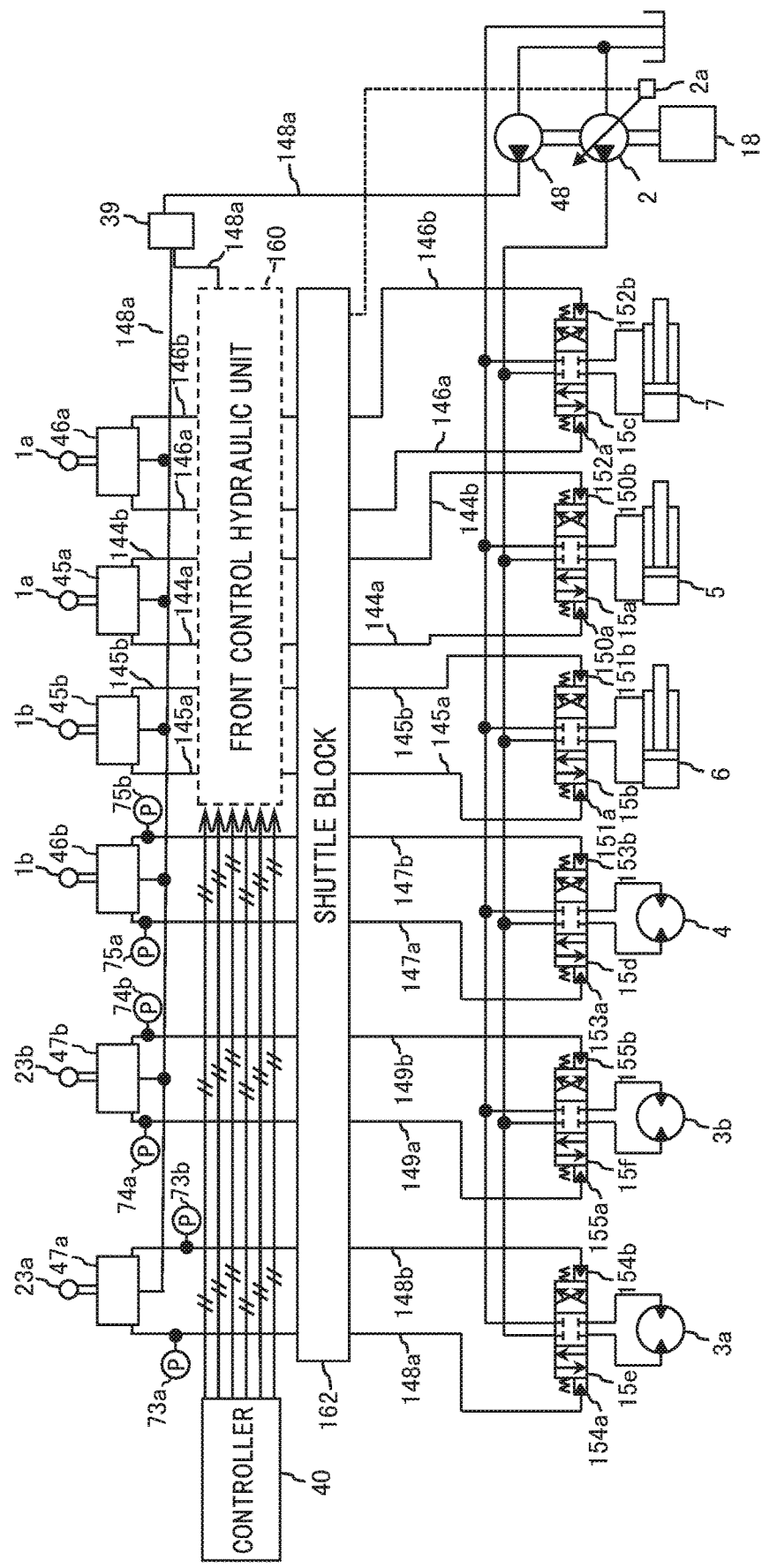
FIG. 2 is a diagram illustrating the controller of the hydraulic excavator of FIG. 1 together with a hydraulic drive system.
Figure 3:
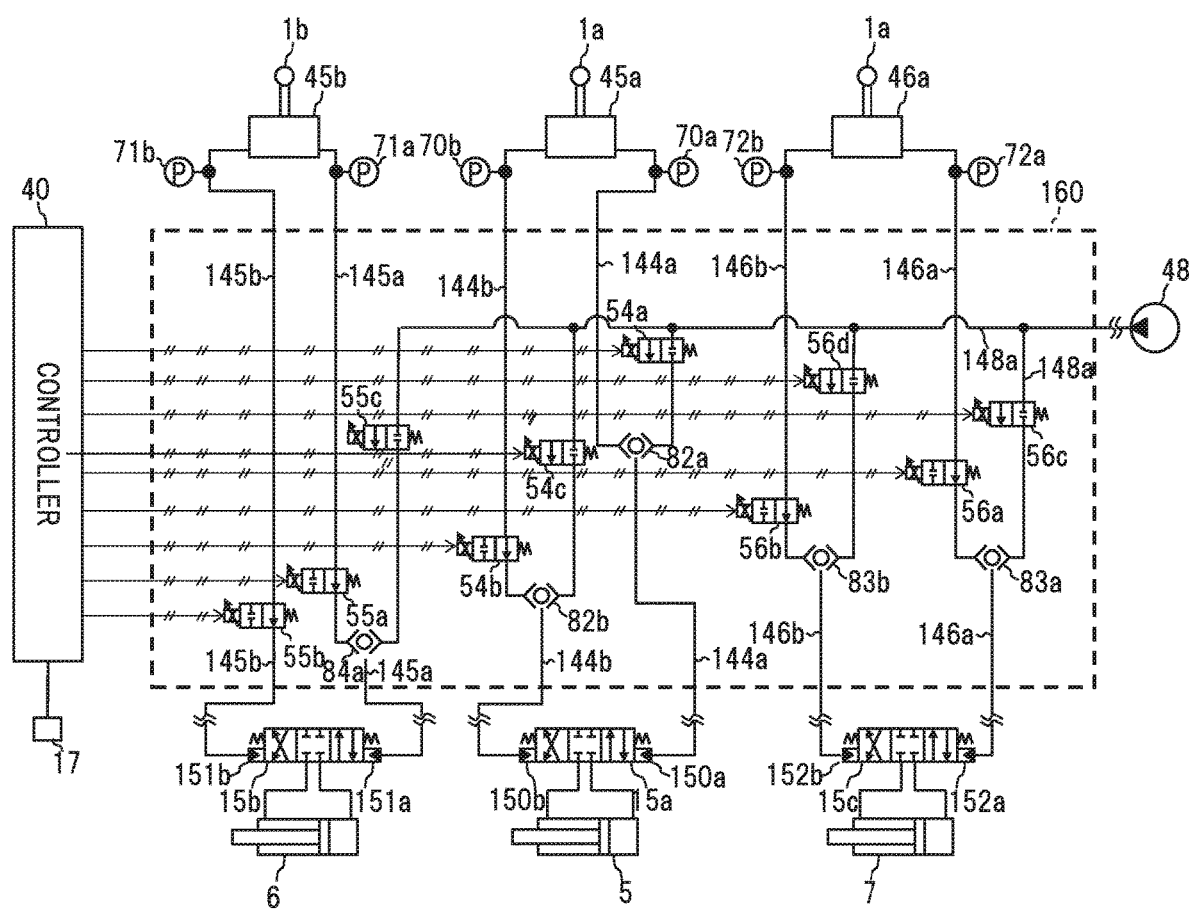
FIG. 3 is a detailed diagram of the front control hydraulic unit 160 of FIG. 2.

FIG. 1 is a structural diagram illustrating a hydraulic excavator according to Embodiment 1 of the invention. FIG. 2 illustrates the controller of the hydraulic excavator of Embodiment 1 of the invention and a hydraulic drive system. FIG. 3 illustrates the front control hydraulic unit 160 of FIG. 2 in detail.

As illustrated in FIG. 1, a hydraulic excavator 1 includes a multi-joint front work implement 1A and a machine body 1B. The machine body 1B includes a lower travel structure 11 that travels with a right travel motor 3$a$ and a left travel motor 3$b$ and an upper swing structure 12 attached swingably atop the lower travel structure 11. The front work implement 1A is formed by connecting multiple vertically-pivoting drivable members (a boom 8, an arm 9, and a bucket 10). The proximal end of the boom 8 of the front work implement 1A is supported at the front of the upper swing structure 12.

An engine 18, a prime mover, is installed on the upper swing structure 12 and used to drive a hydraulic pump 2 and a pilot pump 48. The hydraulic pump 2 is a variable displacement pump whose volume is controlled by a regulator 2$a$ while the pilot pump 48 is of the fixed displacement type. In the present embodiment, a shuttle block 162 is provided in the middle of the pilot lines 144, 145, 146, 147, 148, and 149. The hydraulic signals output from operating devices 45, 46, and 47 are input also to the regulator 2$a$ via the shuttle block 162. By the hydraulic signals being input to the regulator 2$a$ via the shuttle block 162, the discharge flow rate of the hydraulic pump 2 is controlled based on the hydraulic signals. The detailed structure of the shuttle block 162 will not be described herein.

A pump line 148$a$, a discharge pipe of the pilot pump 48, extends from the pilot pump 48 to a lock valve 39, where it diverges to be connected to the operating devices 45, 46, and 47 and the valves inside the front control hydraulic unit 160. In the present embodiment, the lock valve 39 is a solenoid switch valve, and its electromechanically operating unit is electrically connected to the position sensor of the gate lock lever (not illustrated) installed in the cab (see FIG. 1). The position sensor detects the position of the gate lock lever and outputs to the lock valve 39 a signal that is based on that position. When the gate lock lever is in the lock position, the lock valve 39 is closed, interrupting the pump line 148$a$. Conversely, when the gate lock lever is in the unlock position, the lock valve 39 opens, which opens the pump line 148$a$ as well. In other words, when the pump line 148$a$ is interrupted, any manual operation through the operating devices 45, 46, and 47 are disabled, meaning that any swing or excavation operation is not allowed to be performed.

The boom 8, the arm 9, the bucket 10, and the upper swing structure 12 constitute drivable members that are driven respectively by a boom cylinder 5, an arm cylinder 6, a bucket cylinder 7, and a hydraulic swing motor 4 (hydraulic actuators). Operation instructions to the drivable members 8, 9, 10, and 12 are output by the operator controlling the right travel lever 23$a$, left travel lever 23$b$, right operating lever 1a, and left operating lever 1b installed within the cab on the upper swing structure 12 (these levers are also called, collectively, the operating levers 1 and 23).

Inside the cab are an operating device 47a having the right travel lever 23a, an operating device 47b having the left travel lever 23b, operating devices 45a and 46a having the right operating lever 1a, and operating devices 45b and 46b having the left operating lever 1b. The operating devices 45, 46, and 47 are of the hydraulic pilot-operated type and generate, from the hydraulic fluid discharged from the pilot pump, the pilot pressures (also called operating pressures) that match the amounts of input (lever strokes for example) and the directions of the input to the operating levers 1 and 23 operated by the operator. The thus generated pilot pressures are supplied to the hydraulically driven units 150a to 155b of the flow control valves 15a to 15f (see FIG. 2) inside a control valve unit 20 via the pilot lines 144a to 149b (see FIG. 2) and used as control signals to drive the flow control valves 15a to 15f.

The hydraulic fluid discharged from the hydraulic pump 2 is supplied to the hydraulic right travel motor 3a, the hydraulic left travel motor 3b, the hydraulic swing motor 4, the boom cylinder 5, the arm cylinder 6, and the bucket cylinder 7 via the flow control valves 15a, 15b, 15c, 15d, 15e, and 15f (see FIG. 2). With the hydraulic fluid supplied, the boom cylinder 5, the arm cylinder 6, and the bucket cylinder 7 expand or contract, causing the boom 8, the arm 9, and the bucket 10 to pivot and thereby changing the position or posture of the bucket 10. Also, the hydraulic fluid supplied causes the hydraulic swing motor 4 to rotate, which in turn causes the upper swing structure 12 to swing relative to the lower travel structure 11. Furthermore, the hydraulic fluid supplied causes the hydraulic right travel motor 3a and the hydraulic left travel motor 3b to rotate, which in turn causes the lower travel structure 11 to travel.

To measure the pivot angles $\alpha$, $\beta$, and $\gamma$ of the boom 8, the arm 9, and the bucket 10 (see FIG. 5), a boom angle sensor 30, an arm angle sensor 31, and a bucket angle sensor 32 are attached to a boom pin, an arm pin, and a bucket link 13, respectively. Also, a machine body tilt angle sensor 33 is attached to the upper swing structure 12 to detect the front-back directional tilt angle $\theta$ (see FIG. 5) of the upper swing structure 12 (machine body 1B) relative to a reference surface (e.g., a horizontal plane).

Figure 8:
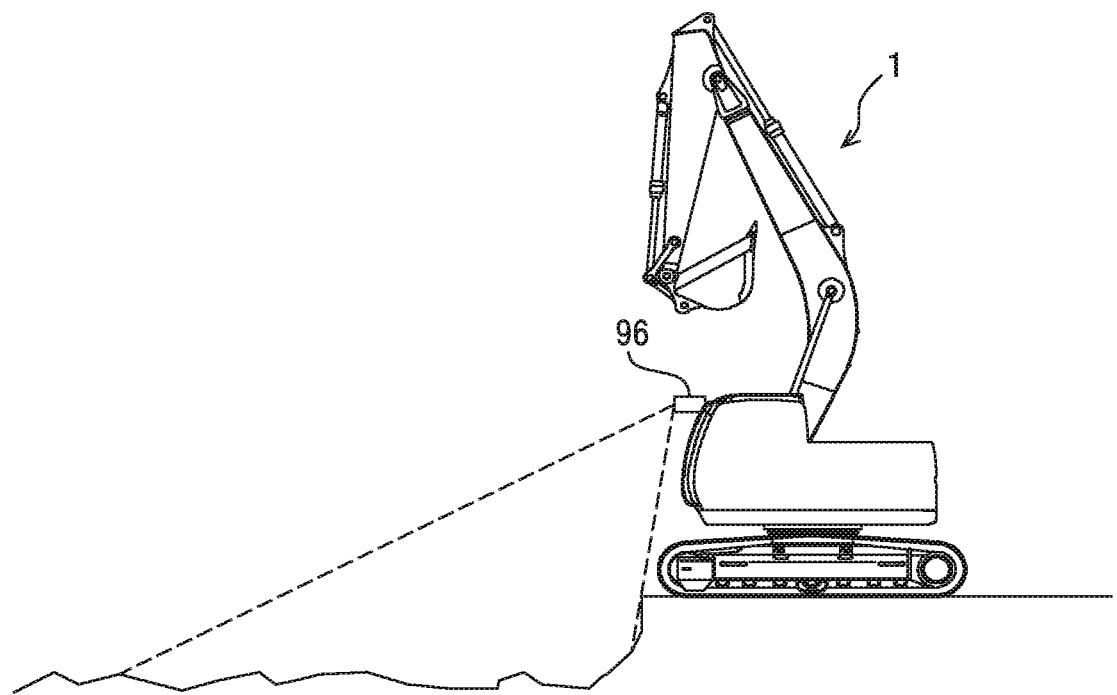
FIG. 8 is a diagram illustrating the installation position of a topographic measurement device 96 and its measurement range.

A topographic measurement device 96 (see FIGS. 1 and 8) is attached at an upper front end section of the cab to measure the nearby topography of the hydraulic excavator 1. The topographic measurement device 96 can be a 3D laser scanner. A 3D laser scanner outputs the radiation angle of a laser beam and the time required for the beam to be reflected back to the radiation source. Based on the distance obtained by the conversion of the time and on the radiation angle, the positional information (three-dimensional coordinates) of a point on the ground is calculated. The positional information of each point is used by a controller 40 as the nearby topographic information of the hydraulic excavator. The topographic measurement device 96 can be one capable of calculating the distance to a measurement object; thus, it can instead be a stereo camera utilizing the parallax viewed from two cameras or a millimeter-wave scanner involving the use of electromagnetic waves. The topographic measurement device 96 can also be installed at a different location other than the upper front end section of the cab as long as the nearby topography can be measured.

The hydraulic excavator of the present embodiment also includes an excavation control system that assists the operator in performing excavation operation. Specifically, receiving an excavation operation from any of the operating devices 45b and 46a (specifically, at least one of an arm crowd instruction, a bucket crowd instruction, and a bucket dump instruction), the excavation control system outputs a control signal that forcibly operates at least one of the hydraulic actuators 5, 6, and 7 (e.g., a control signal that forcibly causes the boom cylinder 5 to expand to raise the boom) to the corresponding flow control valve 15a, 15b, or 15c on the basis of the positional relation between a target surface 60 (see FIG. 5) and the tip of the work implement 1A (the claw tip of the bucket 10 in the embodiment) such that the position of the tip of the work implement 1A is maintained on or above the target surface 60. In this specification, the above control is also referred to as 'area limiting control' or 'machine control.' With this control, the claw tip of the bucket 10 is prevented from passing the target surface 60. As a result, an excavation along the target surface 60 is possible regardless of the skilled level of the operator. In the present embodiment, the control point used to perform the area limiting control is set to the claw tip of the bucket 10 of the hydraulic excavator (the tip of the work implement 1A). However, the control point can be any point other than the bucket claw tip as long as it is at a tip section of the work implement 1A; for example, it can be a point on the bottom surface of the bucket 10 or a point on the outermost surface of the bucket link 13.

In this specification, the term 'first control signals' is used to refer to pilot pressures generated by the operation of the operating devices 45a, 45b, and 46a among control signals for the flow control valves 15a to 15c, and the term 'second control signals' is used to refer to pilot pressures generated by correcting (reducing) the first control signals by the controller 40 driving solenoid proportional valves 54b, 55a, 55b, 56a, and 56b and pilot pressures generated newly, separately from the first control signals, by the controller 40 driving the solenoid proportional valves 54b, 55a, 55b, 56a, and 56b.

The excavation control system, capable of performing the area limiting control, includes a machine control on/off switch 17, installed at a position that does not block the operator's view such as at a position above the control panel in the cab, for switching the active and inactive states of the area limiting control and the controller 40 or a computer capable of performing the area limiting control.

As illustrated in FIG. 3, the front control hydraulic unit 160 includes: pressure sensors 70a and 70b (see FIG. 3), provided on the pilot lines 144a and 144b of the operating device 45a for the boom 8, for detecting pilot pressures (first control signals) as the amounts of input to the operating lever 1a; a solenoid proportional valve 54a (see FIG. 3) for reducing the pilot pressure from the pilot pump 48 and outputting the reduced pilot pressure, the first port side of which being connected to the pilot pump 48 via the pump line 148a; a shuttle valve 82a (see FIG. 3), connected to the pilot line 144a of the operating device 45a for the boom 8 and to the second port of the solenoid proportional valve 54a, for selecting the higher of the pilot pressure inside the pilot line 144a and the control pressure (second control signal) output from the solenoid proportional valve 54a and directing the higher of the two to the hydraulically driven unit 150a of the flow control valve 15a; a solenoid proportional valve 54b (see FIG. 3), installed on the pilot line 144b of the operating device 45a for the boom 8, for reducing the pilot pressure (first control signal) inside the pilot line 144b on the basis of a control signal from the controller 40 and outputting the reduced pilot pressure; a solenoid proportional valve 54c (see FIG. 3) for reducing the pilot pressure from the pilot pump 48 and outputting the reduced pilot pressure, the first port side of which being connected to the pilot pump 48; and a shuttle valve 82b (see FIG. 3) for selecting the higher of the pilot pressure inside the pilot line 144b and the control pressure output from the solenoid proportional valve 54c and directing the higher of the two to the hydraulically driven unit 150b of the flow control valve 15a.

The front control hydraulic unit 160 also includes: pressure sensors 71a and 71b (see FIG. 3), installed on the pilot line 145a and 145b for the arm 9, for detecting pilot pressures (first control signals) as the amounts of input to the operating lever 1b and outputting the detected pressures to the controller 40; a solenoid proportional valve 55b (see FIG. 3), installed on the pilot line 145b, for reducing a pilot pressure (first control signal) on the basis of a control signal from the controller 40 and outputting the reduced pilot pressure; a solenoid proportional valve 55a (see FIG. 3), installed on the pilot line 145a, for reducing the pilot pressure (first control signal) inside the pilot line 145a on the basis of a control signal from the controller 40 and outputting the reduced pilot pressure; a solenoid proportional valve 55c (see FIG. 3) for reducing the pilot pressure from the pilot pump 48 and outputting the reduced pilot pressure, the first port side of which being connected to the pilot pump 48; and a shuttle valve 84a (see FIG. 3) for selecting the higher of the pilot pressure inside the pilot line 145a and the control pressure output from the solenoid proportional valve 55c and directing the higher of the two to the hydraulically driven unit 151a of the flow control valve 15b.

The front control hydraulic unit 160 further includes: pressure sensors 72a and 72b (see FIG. 3), installed on the pilot lines 146a and 146b for the bucket 10, for detecting pilot pressures (first control signals) as the amounts of input to the operating lever 1a and outputting the detected pilot pressures to the controller 40; solenoid proportional valves 56a and 56b (see FIG. 3) for reducing pilot pressures (first control signals) on the basis of control signals from the controller 40 and outputting the reduced pilot pressures; solenoid proportional valves 56c and 56d (see FIG. 3) for reducing the pilot pressure from the pilot pump 48 and outputting the reduced pilot pressure, the first port side of which being connected to the pilot pump 48; and shuttle valves 83a and 83b (see FIG. 3), the former valve selecting the higher of the pilot pressure inside the pilot line 146a and the control pressure output from the solenoid proportional valve 56c and directing the higher of the two to the hydraulically driven unit 152a of the flow control valve 15c, the latter valve selecting the higher of the pilot pressure inside the pilot line 146b and the control pressure output from the solenoid proportional valve 56d and directing the higher of the two to the hydraulically driven unit 152b of the flow control valve 15c. In FIG. 3, the lines connecting the pressure sensors 70, 71, and 72 to the controller 40 are not shown for lack of space.

In the front control hydraulic unit 160 structured as above, when the controller 40 outputs control signals to drive the solenoid proportional valves 54a, 54c, 55c, 56c, and 56d, pilot pressures (second control signals) can be generated even without the manual operation of the operating devices 45a, 45b, and 46a. Thus, boom raising, boom lowering, arm crowding, bucket crowding, or bucket dumping operation can be generated forcibly. When the controller 40 drives the solenoid proportional valves 54b, 55a, 55b, 56a, and 56b, pilot pressures (second control signals) obtained by reducing the pilot pressures (first control signals) generated by the manual operation of the operating devices 45a, 45b, and 46a can be generated. Thus, the speeds of boom lowering, arm crowding/dumping, and bucket crowding/dumping operations can be reduced more forcibly than through manual operation.

The information input to the controller 40 includes information on the shape and position of the target surface 60 stored on a ROM 93 or RAM 94, described later, detection signals of the angle sensors 30 to 32 and tilt angle sensor 33, and detection signals of the pressure sensors 70 to 72. The controller 40 outputs to the solenoid proportional valves 54 to 56 electric signals that correct control signals (pilot pressure) used to perform area limiting control.

Figure 4:
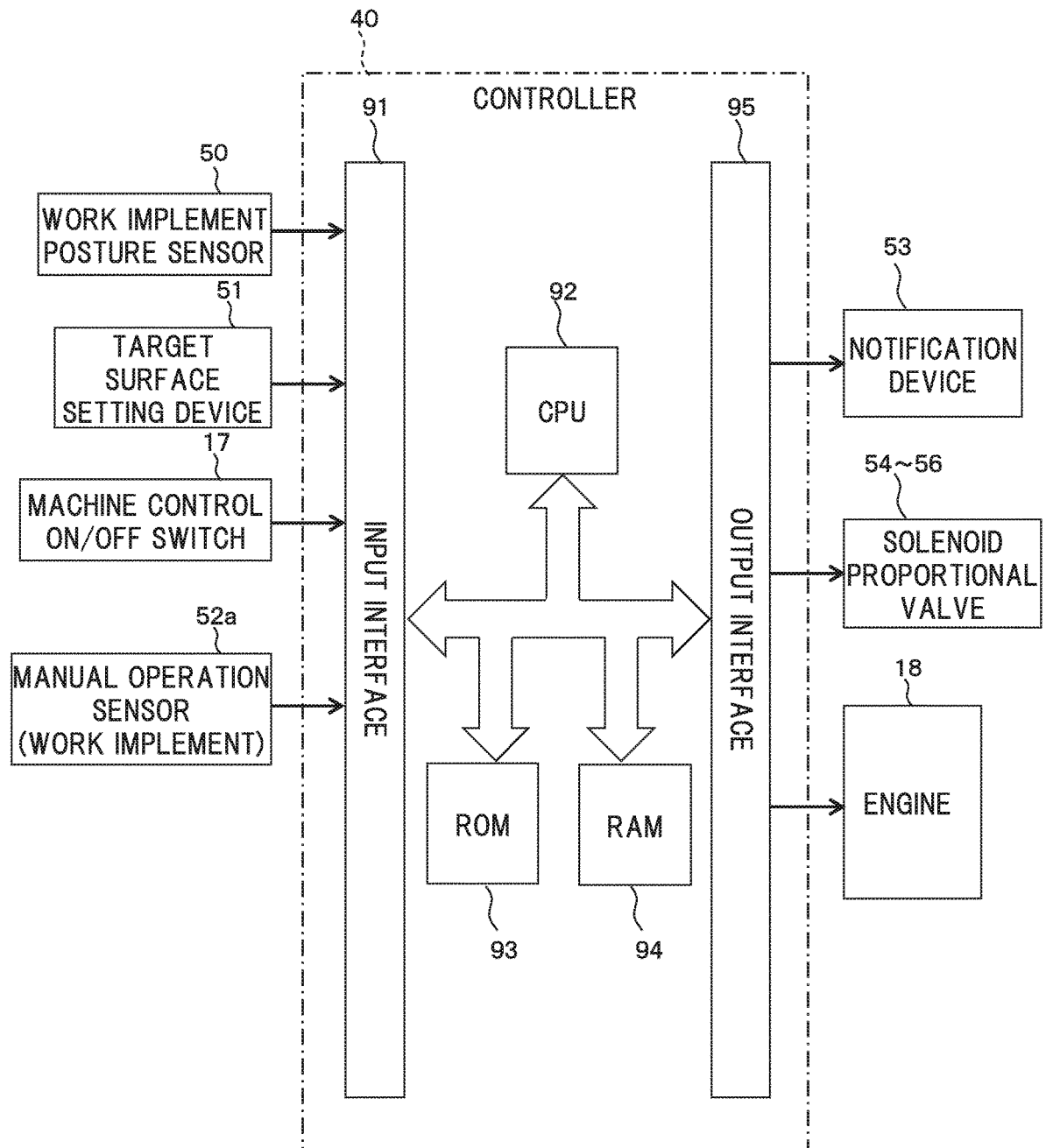
FIG. 4 illustrates the hardware structure of the controller of the hydraulic excavator of FIG. 1.

FIG. 4 illustrates the hardware structure of the controller 40. The controller 40 includes an input unit 91, a central processing unit (CPU) 92, storage devices including a read-only memory (ROM) 93 and a random access memory (RAM) 94, and an output unit 95. The input unit 91 receives signals from the angle sensors 30 to 32 and the tilt angle sensors 33, which constitute a work implement posture sensor 50, signals from a target surface setting device 51 used to set the target surface 60, signals from the machine control on/off switch 17, and signals from the pressure sensors (including pressure sensors 70, 71, and 72) used to detect input amounts from the operating devices 45a, 45b, and 46a, which sensors constitute a manual operation sensor 52a, and preforms A/D conversion. The ROM 93 is a storage medium on which are stored a control program used to perform area limiting control and the processing according to the later-described flowchart and information used to perform the operations of the flowchart. The CPU 92 performs predetermined calculation processing on the signals it received from the input unit 91 and the memories 93 and 94 on the basis of the control program stored on the ROM 93. The output unit 95 creates signals for output based on the calculation results obtained by the CPU 92 and output the signals to the solenoid proportional valves 54 to 56 and a notification device 53, thereby driving or controlling the hydraulic actuators 5 to 7 and displaying images of the machine body 1B, the bucket 10, the target surface 60 and so forth on the screen of a monitor, which is part of the notification device 53.

The notification device 53 includes at least one of the following: a display (display device) for showing the positional relation between the target surface 60 and the front work implement 1A to the operator and a speaker for notifying the operator of the positional relation between the target surface 60 and the front work implement 1A through sound (or voice).

The controller 40 of FIG. 4 includes the semiconductor memories such as the ROM 93 and the RAM 94, however, they can be replaced with other storage devices, such as magnetic storage devices including hard disk drives.

Figure 6:
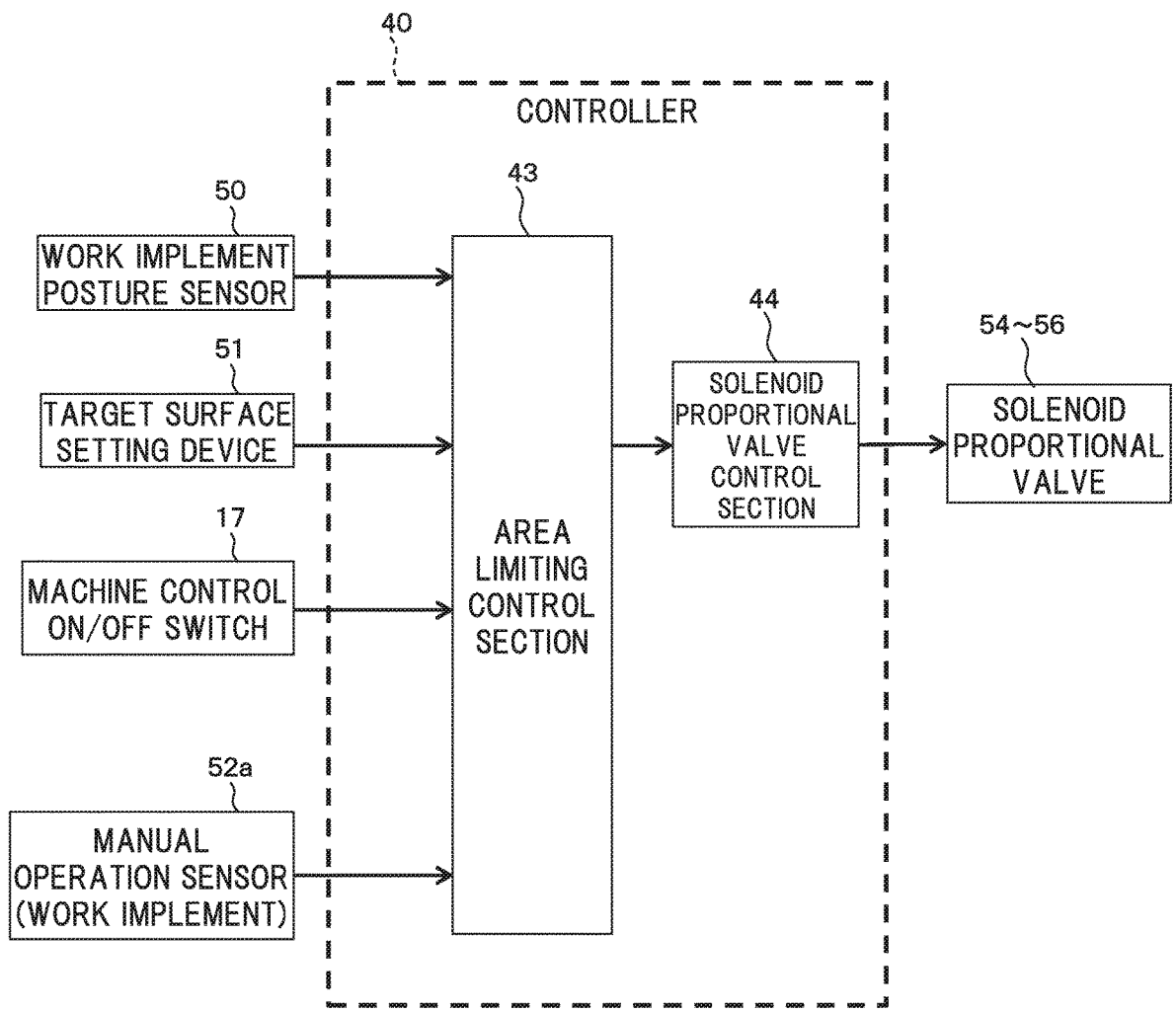
FIG. 6 is a functional block diagram of the controller of the hydraulic excavator of FIG. 1.

FIG. 6 is a functional block diagram of the controller 40 of the present embodiment. The controller 40 includes an area limiting control section 43 and a solenoid proportional valve control section 44.

When the claw tip of the bucket 10 is approaching the target surface 60 by the operating device 45b outputting a control signal (first control signal) instructing the arm 8 to perform a crowding operation, the area limiting control section 43 of the present embodiment is used to perform the processing for the machine control on the front work implement 1A by forcibly generating a control signal (second control signal) for the boom cylinder 5 (flow control valve 15a) and outputting the generated control signal to the flow control valve 15a so that the claw tip of the bucket 10 can move along the target surface 60.

Connected to the area limiting control section 43 are the work implement posture sensor 50, the target surface setting device 51, and the machine control on/off switch 17.

The work implement posture sensor 50 consists of the boom angle sensor 30, the arm angle sensor 31, the bucket angle sensor 32, and the machine body tilt angle sensor 33.

The target surface setting device 51 is an interface capable of receiving information on target surfaces 60 (including the positional information and tilt angle information of target surfaces). The inputting of a target surface through the target surface setting device 51 can be done manually by the operator or can be externally received with the use of a network. A satellite communication antenna such as a GNSS receiver (not illustrated) is connected to the target surface setting device 51. If the excavator can communicate with an external terminal storing the 3D data of target surfaces defined in a global coordinate system (absolute coordinate system), the 3D data of the external terminal can be searched for the target surface corresponding to the excavator position on the basis of the global coordinates of the excavator identified by the antenna, and that target surface can thus be input to the controller.

The manual operation sensor 52a consists of the pressor sensors 70a, 70b, 71a, 71b, 72a, and 72b that acquire the operating pressures generated in the pilot lines 144, 145, and 146 by the operator controlling the operating levers 1a and 1b (operating devices 45a, 45b, and 46a). In other words, it detects manual operations performed on the hydraulic cylinders 5, 6, and 7 related to the work implement 1A.

Figure 7:
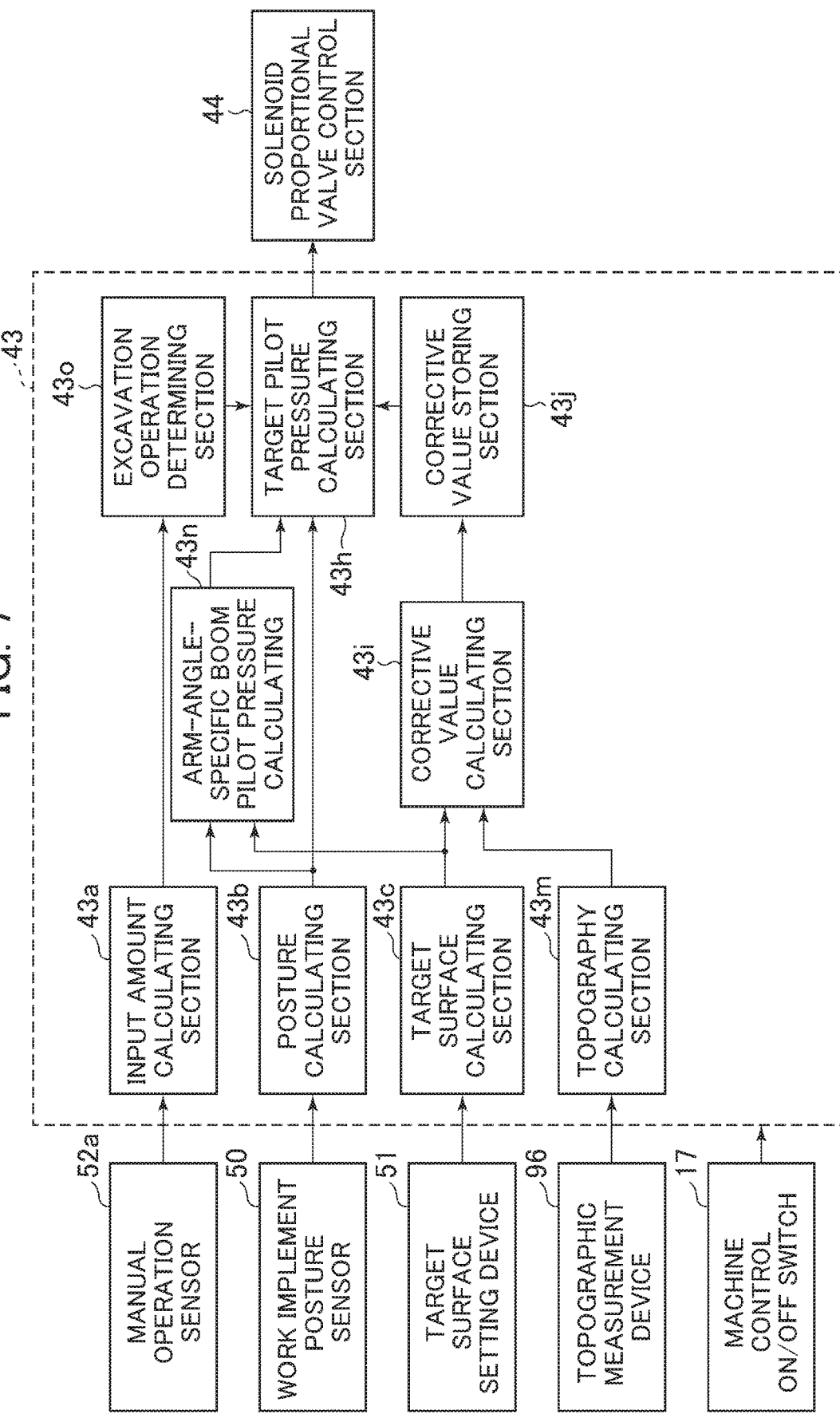
FIG. 7 is a functional block diagram of the area limiting control section 43 of FIG. 6.

FIG. 7 is a functional block diagram of the area limiting control section 43 of FIG. 6. The area limiting control section 43 includes an input amount calculating section 43a, a posture calculating section 43b, a target surface calculating section 43c, a topography calculating section 43m, an arm-angle-specific boom pilot pressure calculating section 43n, an excavation operation determining section 43o, a target pilot pressure calculating section 43h, a corrective value calculating section 43i, and a corrective value storing section 43j.

The input amount calculating section 43a calculates the amounts of input to the operating devices 45a, 45b, and 46a (operating levers 1a and 1b) based on the input from the manual operation sensor 52a. The amounts of input to the operating devices 45a, 45b, and 46a can be calculated from the values detected by the pressor sensors 70, 71, and 72.

The calculation of input amounts with the pressure sensors 70, 71, and 72 is only meant to be an example. Alternatively, the amounts of input to the operating levers can be detected using position sensors (e.g., rotary encoders) that detect the rotational displacements of the operating levers of the operating devices 45a, 45b, and 46a. Further, in place of the structure in which operating speeds are calculated from input amounts, the structure in which stroke sensors for detecting the amount of expansion and contraction of each of the hydraulic cylinders 5, 6, and 7 are attached and the operating speed of each of the cylinders is calculated based on temporal changes in the detected amounts of expansion and contraction is also applicable.

Figure 5:
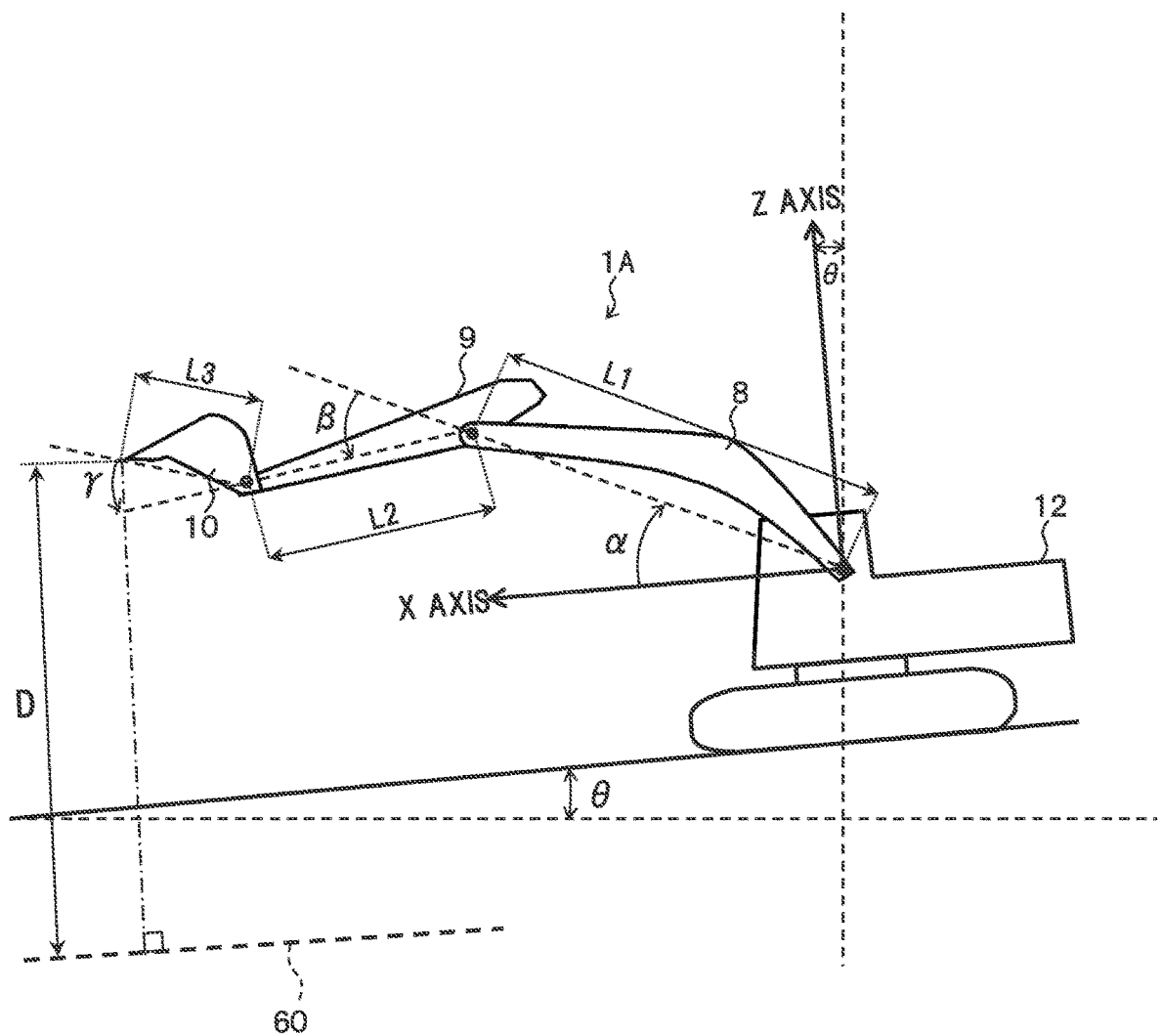
FIG. 5 is a diagram illustrating the coordinate system of the hydraulic excavator of FIG. 1 and a target surface.

The posture calculating section 43b calculates the posture of the work implement 1A and the position of the claw tip of the bucket 10 on the basis of the information obtained from the work implement posture sensor 50. The posture of the work implement 1A can be defined in the excavator coordinate system of FIG. 5. The excavator coordinate system of FIG. 5 is the coordinate system set for the upper swing structure 12, in which the proximal end of the boom 8 supported pivotably by the upper swing structure 12 is the origin, a vertical direction of the upper swing structure 12 is the Z axis, and a horizontal direction is the X axis. The tilt angle of the boom 8 relative to the X axis is the boom angle $\alpha$, the tilt angle of the arm 9 relative to the boom 8 is the arm angle $\beta$, and the tilt angle of the bucket claw tip relative to the arm is the bucket angle $\gamma$. The tilt angle of the machine body 1B (upper swing structure 12) relative to a horizontal plane (reference plane) is denoted as the tilt angle $\theta$. The boom angle $\alpha$ is detected by the boom angle sensor 30, the arm angle $\beta$ by the arm angle sensor 31, the bucket angle $\gamma$ by the bucket angle sensor 32, and the tilt angle $\theta$ by the machine body tilt angle sensor 33. If the lengths of the boom 8, the arm 9, and the bucket 10 are denoted as L1, L2, and L3, respectively, as illustrated in FIG. 5, the coordinates of the bucket claw tip in the excavator coordinate system and the posture of the work implement 1A can be expressed by L1, L2, L3, $\alpha$, $\beta$, and $\gamma$.

The target surface calculating section 43c calculates the positional information of target surfaces 60 based on the information obtained from the target surface setting device 51 and stores it on the ROM 93. As illustrated in FIG. 5, in the present embodiment, a 3D target surface is cut with the plane on which the work implement 1A moves (the operation plane of the work implement), and the resultant surface is used as a target surface 60 (a 2D target surface).

The topography calculating section 43m calculates the positional information (coordinates) of points on the ground based on the radiation angles and distances input from the topographic measurement device 96 and stores it on the ROM 93 as topographical information. In other words, the topography calculating section 43m calculates, based on the topographical information input from the topographic measurement device 96, the positional information of a topography formed by the work implement 1A (also called 'a finished shape') that has been machine-controlled based on a second control signal.

The excavation operation determining section 43o determines, based on an input amount it received from the input amount calculating section 43a, whether or not the excavation operation (in the present embodiment, this refers to arm crowding operation, or expanding operation of the arm cylinder 6) has been input through the operating device 45b and then outputs the result to the target pilot pressure calculating section 43h.

The arm-angle-specific boom pilot pressure calculating section 43n assumes that an arm crowding operation at a predetermined pilot pressure (for example, the pilot pressure obtained when the amount of input to the operating lever 1b is the maximum) has been input in the posture of the work implement 1A at that time (at the time of executing the processing), and in order to realize the movement of the bucket claw tip along a target surface 60 by causing a forcible boom operation to intervene for the arm crowding operation by the machine control, the arm-angle-specific boom pilot pressure calculating section 43n calculates a series of values of boom pilot pressure (second control signals) to be output at each arm angle $\beta$. The result of the calculation is stored on the ROM 93. Instead of calculating a boom pilot pressure for each arm angle, it is also possible to derive a formula that represents boom pilot pressure by a function of arm angle and store it on the ROM 93.

Figure 9:
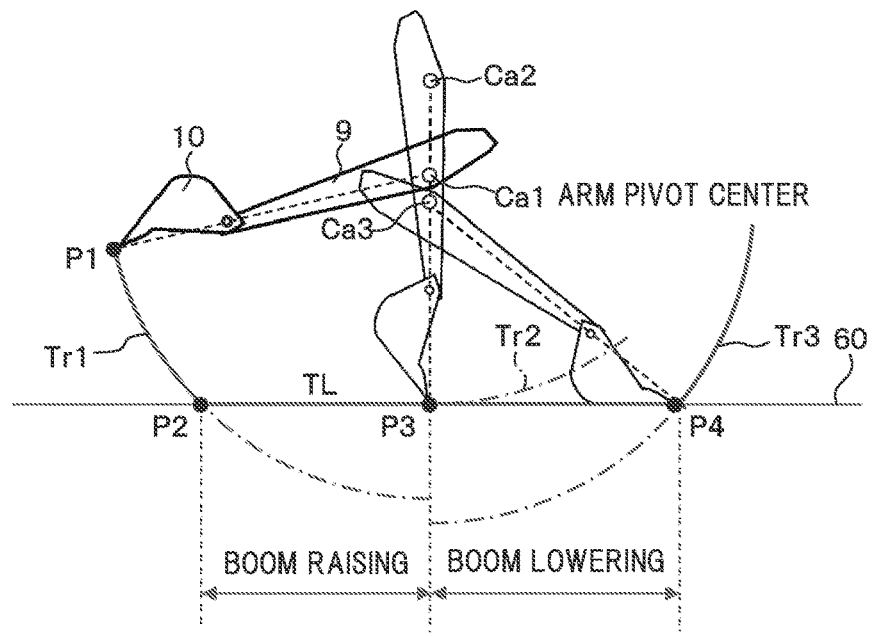
FIG. 9 is a diagram illustrating the arm operation and the movement trajectory of the bucket claw tip during machine control.

FIG. 9 illustrates a specific example of how the arm-angle-specific boom pilot pressure calculating section 43n performs processing. For simplification purposes, the bucket 10 is assumed not to be operated.

First, based on the posture information of the work implement 1A and the positional information of the claw tip of the bucket 10 calculated by the posture calculating section 43b and the positional information of a target surface 60 calculated by the target surface calculating section 43c, the arm-angle-specific boom pilot pressure calculating section 43n knows the positional relation between the bucket claw tip and the target surface 60 and the posture of the work implement 1A at that time. Assume here that with this, the arm-angle-specific boom pilot pressure calculating section 43n can know that the bucket claw tip (P1), the pivot center of the arm (Ca1), and the target surface 60 are in the positional relationship at the start time of the processing as illustrated in FIG. 9 at the start of operation. The arm-angle-specific boom pilot pressure calculating section 43n assumes that arm crowding operation of a predetermined pilot pressure (e.g., the pilot pressure obtained when the amount of input to the operating lever 1b is the maximum) has been input at this state and calculates an arc Tr1 or the trajectory of the bucket claw tip at that time. Next, the intersecting point between the arc Tr1 and the target surface 60 is calculated. In the case of FIG. 9, because P2 exists as the intersecting point between the two, the assumption is made that for the arm angles after the intersecting point P2, boom control (machine control) based on machine control is added to the arm crowding operation of the predetermined pilot pressure to move the bucket claw tip 10 along the target surface (that is, move the bucket claw tip along the straight line TL of FIG. 9), and a boom pilot pressure to be output by machine control in that case is calculated for each arm angle. If the trajectory (arc) of the bucket claw tip and the target surface 60 do not intersect, the boom pilot pressure is set to 0 for each arm angle, and machine control is not performed.

For the arm angles after the intersecting point (P2), the arm-angle-specific boom pilot pressure calculating section 43n further searches for the point at which the vertical component (negative when it faces downward in the figure, and positive when it faces upward) of the speed vector of the bucket claw tip attributed to the arm operation (the tangent-directional vector of the arc at the point where the bucket claw tip is located) with respect to the target surface 60 turns from negative to positive, calculates pilot pressures for boom raising from P2 to that point, and calculates pilot pressures for boom lowering after that point. In the case of FIG. 9, since the vertical component of the speed vector turns from negative to positive at point P3, boom raising pilot pressures to be generated by the solenoid proportional valve 54a are calculated from point P2 to point P3, and boom lowering pilot pressures to be generated by the solenoid proportional valve 54c are calculated from point P3 to point P4. In FIG. 9, Tr2 is an arc having point P3, and Tri is an arc having point P4.

Figure 10:
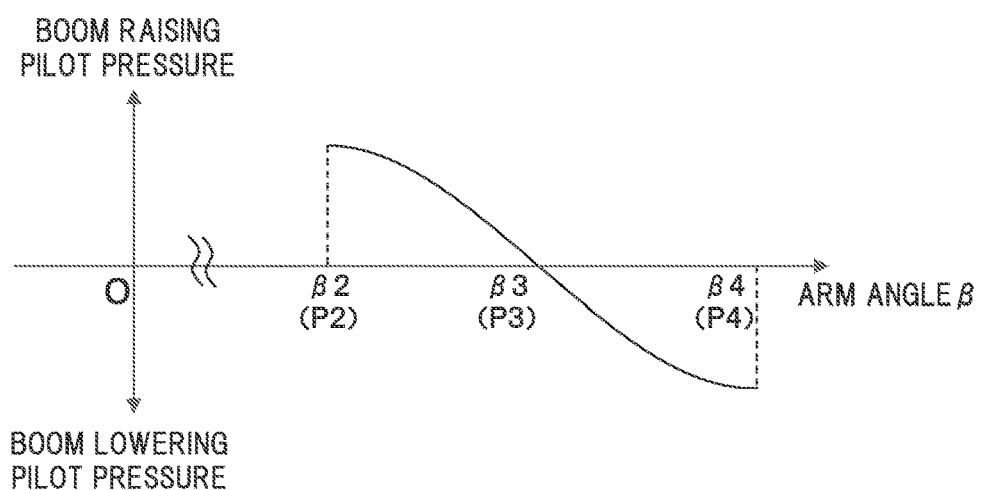
FIG. 10 is a diagram illustrating the result of calculating arm-angle-specific boom pilot pressures by an arm-angle-specific boom pilot pressure calculating section 43$n$.

FIG. 10 is a diagram illustrating the results of calculation of boom pilot pressures for respective arm angles in the case of FIG. 9 by the arm-angle-specific boom pilot pressure calculating section 43n. In FIG. 10, the arm angles at points P2, P3, and P4 of FIG. 9 are denoted as β2, β3, and β4, respectively. As illustrated in this figure, after a boom raising pilot pressure is generated at point P2 and becomes 0 once at point P3, boom lowering pilot pressures are generated up to point P4. With this, as illustrated in FIG. 9, the arm pivot center, which was located at Ca1 at point P2, moves upward by boom raising and reaches Ca2 at point P3; thereafter, it moves downward by boom lowering and reaches Ca3 at point P4.

Figure 11:
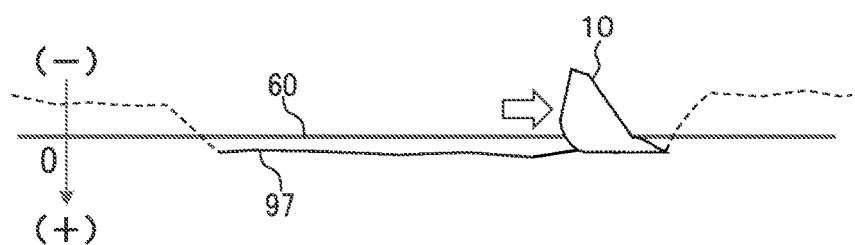
FIG. 11 illustrates an example of a target surface 60 and a finished shape 97.

The corrective value calculating section 43i is the part that calculates corrective values for boom pilot pressures (second control signals) when machine control is active. The corrective value calculating section 43i knows the vertical positional relation between a target surface 60 and a finished shape in the same coordinate system on the basis of the information on the target surface 60 of the target surface calculating section 43c and the topographic information of the topography calculating section 43m (that is, knows it in the excavator coordinate system or the global coordinate system, and conversion of coordinates is performed if necessary (the same applies in the same processing below)), and calculates a corrective value based on the distance between the target surface 60 and the finished shape 97. An example of a target surface 60 and finished shape 97 is illustrated in FIG. 11. It is assumed that the distance between the target surface 60 and the finished shape 97 is the distance between the target surface 60 and the finished shape 97 in a direction perpendicular to the target surface 60, and that the position of the target surface 60 is the reference (zero). Being below the target surface 60 is positive while being above it is negative. Thus, in the case of FIG. 11, the distance between the target surface 60 and the finished shape 97 is positive. Because the finished shape 97 is typically formed by multiple points with different vertical distances from the target surface 60, in the present embodiment, the distance to the target surface 60 is calculated for each of the multiple points forming the finished shape 97, and the average of the multiple distances calculated is used as the distance between the target surface 60 and the finished shape 97. However, the calculation of the 'distance' between the target surface 60 and the finished shape 97 is not limited to this method, and it is possible to, for example, use the distance between any point selected from the multiple points forming the finished shape 97 and the target surface 60 as the 'distance' or approximate the finished shape 97 to a straight line parallel to the target surface 60 and use the distance between the straight line and the target surface as the 'distance.'

Figure 12:
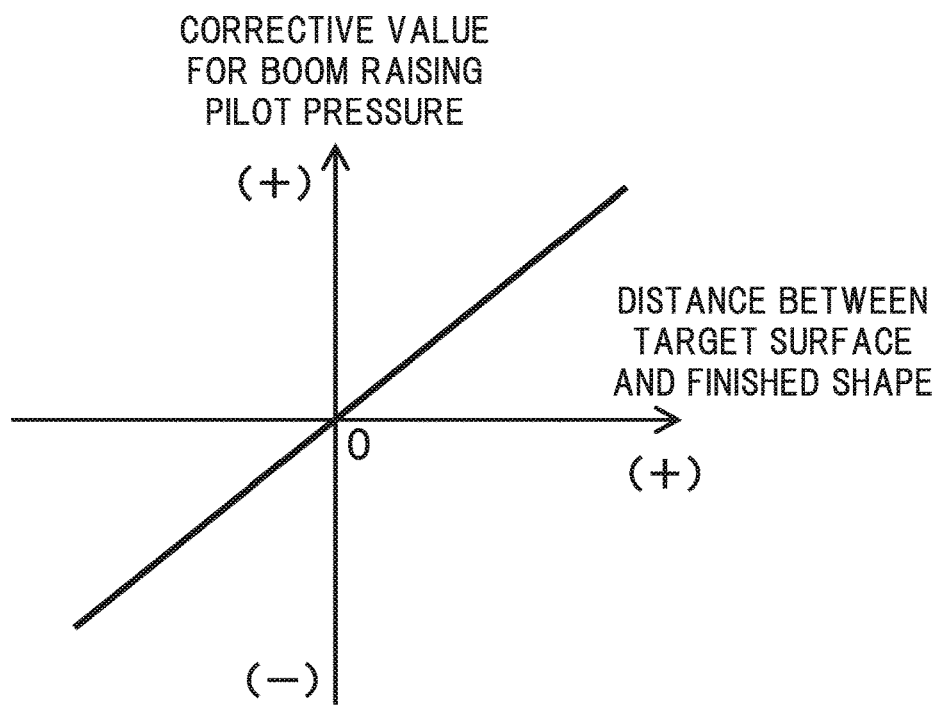
FIG. 12 illustrates the correlation between the distance from the target surface 60 to the finished shape 97 and the corrective value for boom raising pilot pressure.
Figure 13:
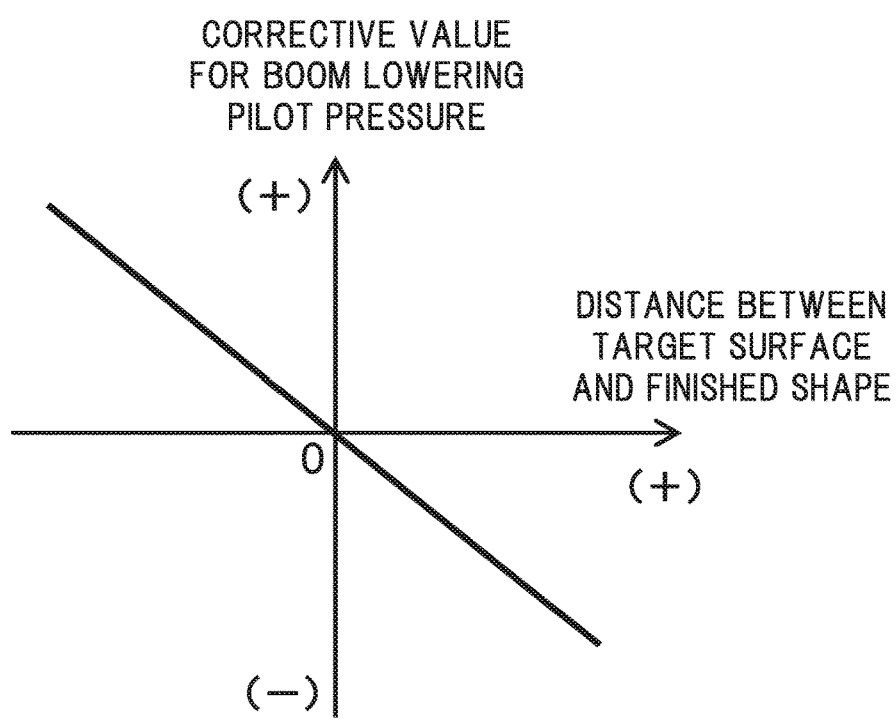
FIG. 13 illustrates the correlation between the distance from the target surface 60 to the finished shape 97 and the corrective value for boom lowering pilot pressure.

The corrective value calculating section 43i calculates corrective values for boom raising and lowering pilot pressures (second control signals) using the calculated distance between the target surface 60 and the finished shape 97 and FIGS. 12 and 13 and stores the two calculated corrective values on the corrective value storing section 43j. FIG. 12 is a correlation diagram between the distance between the target surface 60 and the finished shape 97 and corrective values for boom raising pilot pressures. Corrective values for boom raising pilot pressures are set such that they increase with increase in the distance between the target surface 60 and the finished shape 97. FIG. 13 is a correlation diagram between the distance between the target surface 60 and the finished shape 97 and corrective values for boom lowering pilot pressures. Corrective values for boom lowering pilot pressures are set such that they decrease with increase in the distance between the target surface 60 and the finished shape 97.

The corrective value storing section 43j is the part that stores the results of calculations by the corrective value calculating section 43i. Stored corrective values are overwritten each time corrective values are calculated by the corrective value calculating section 43i and referred to by the target pilot pressure calculating section 43h when machine control is activated.

The target pilot pressure calculating section 43h outputs a predetermined arm crowding pilot pressure to the solenoid proportional valve control section 44 as the target pilot pressure of the flow control valve 15b when arm crowding operation is being performed and outputs the boom pilot pressure determined based on the calculation results of the arm-angle-specific boom pilot pressure calculating section 43n to the solenoid proportional valve control section 44 as the target pilot pressure of the flow control valve 15a.

Specifically, when the determination result that arm crowding is being performed is input from the excavation operation determining section 43o, the target pilot pressure calculating section 43h outputs a fixed value to the solenoid proportional valve control section 44 as the arm crowding pilot pressure while the determination result is being input, regardless of the input amount for the arm crowding by the operating device 45b, and determines the boom pilot pressure at the arm angle at that time on the basis of the arm-angle-specific boom pilot pressure (second control signal) calculated by the arm-angle-specific boom pilot pressure calculating section 43n and the arm angle calculated by the posture calculating section 43b. Further, when the determined boom pilot pressure (second control signal) is not zero (that is, when machine control is active), the corrective value stored on the corrective value storing section 43j is referred to, and the value obtained by adding the corrective value to the determined boom pilot pressure is output to the solenoid proportional valve control section 44 as the boom pilot pressure.

The target pilot pressure calculating section 43h is constituted such that when the determination result that arm crowding operation is not being performed is input from the excavation operation determining section 43o, the pilot pressure that matches the manual operation is output to the corresponding flow control valve 15 on the basis of the calculation results of the input amount calculating section 43a.

The solenoid proportional valve control section 44 calculates a command for each of the solenoid proportional valves 55c, 54a, and 54c on the basis of the target pilot pressure for each of the flow control valves 15a and 15b calculated by the target pilot pressure calculating section 43h.

Operation

Figure 14:
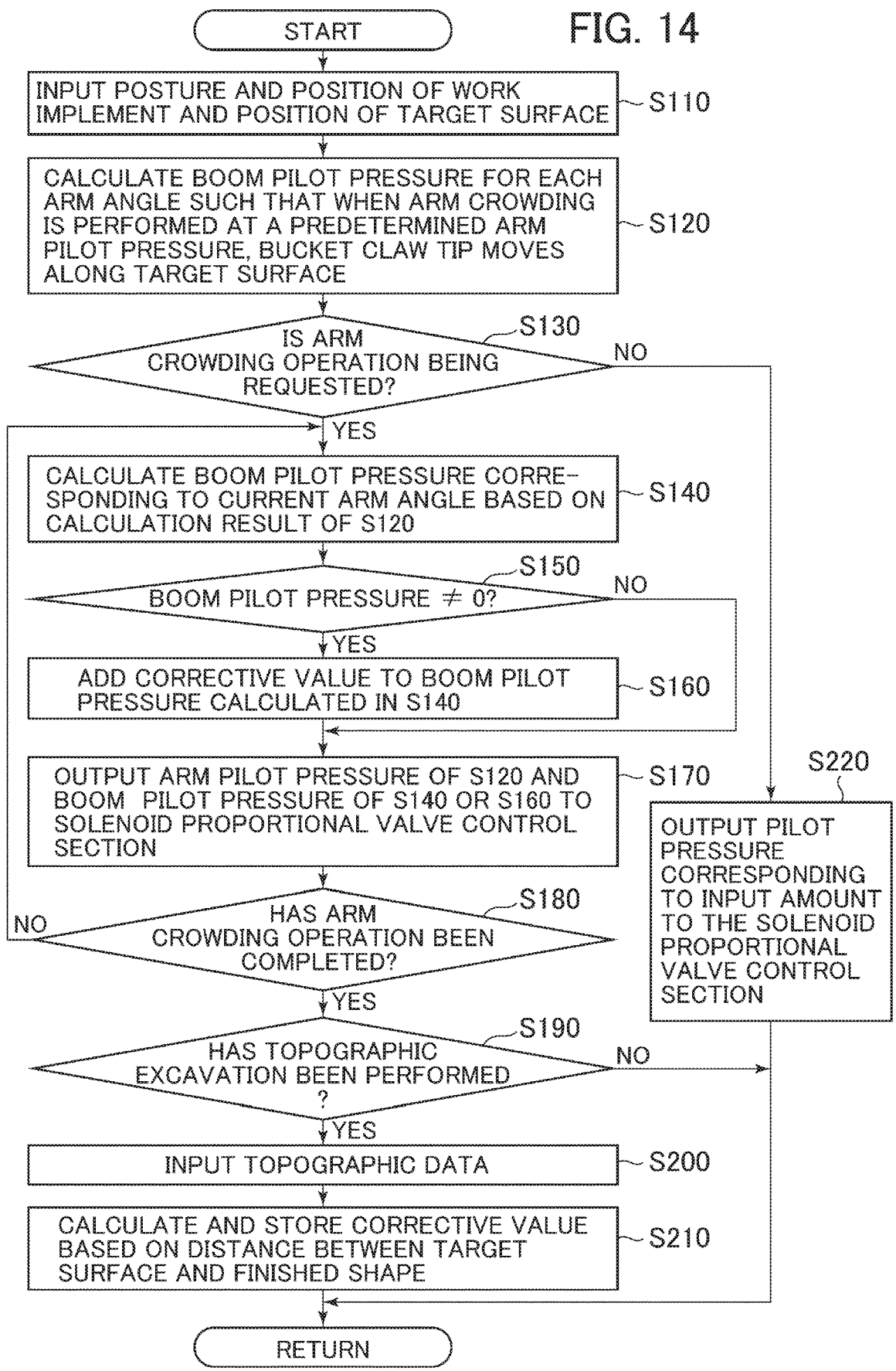
FIG. 14 is a flowchart illustrating the series of processing performed by the controller 40.

The flowchart of FIG. 14 illustrates the operation of the hydraulic excavator constituted as above. The controller 40 executes the flowchart of FIG. 14 at predetermined control cycles.

First, in S110, the arm-angle-specific boom pilot pressure calculating section 43n inputs the posture of the work implement 1A and position of the bucket claw tip 10 calculated by the posture calculating section 43b based on the information from the work implement posture sensor 50 and the position of the target surface 60 calculated by the target surface calculating section 43c based on the information from the target surface setting device 51.

In S120, the arm-angle-specific boom pilot pressure calculating section 43n calculates boom pilot pressures for respective arm angles, based on the information input in S110, such that the claw tip of the bucket 10 moves along the target surface 60 when arm crowding is performed at a predetermined arm pilot pressure (e.g., the pilot pressure value obtained when the amount of input to the operating lever 1b is the maximum). In the case where the bucket claw tip does not reach the target surface 60 even if arm crowding is performed (when the trajectory of the claw tip at the time of arm crowding and the target surface 60 do not intersect), machine control does not need to be activated; thus, the boom pilot pressure is set to 0 for all the arm angles.

In S130, the excavation operation determining section 43o determines based on the input amounts input from the input amount calculating section 43a whether or not an arm crowding operation is being input through the operating device 45b. If it is determined that an arm crowding operation is being input, the process proceeds to S140; if it is determined that an arm crowding operation is not being input, the process proceeds to S220.

In S220, the target pilot pressure calculating section 43h calculates target pilot pressures for the respective hydraulic cylinders corresponding to the input amounts input from the input amount calculating section 43a and outputs them to the solenoid proportional valve control section 44. With this, the work implement 1A operates in response to the input operations for the operating devices 45 and 46.

In S140, the arm-angle-specific boom pilot pressure calculating section 43n receives the arm angle $\beta$ at that time from the posture calculating section 43b and calculates the boom pilot pressure corresponding to the input arm angle $\beta$ based on the arm-angle-specific boom pilot pressures calculated in S120. The process then proceeds to S150.

In S150, the target pilot pressure calculating section 43h determines whether the boom pilot pressure calculated in S140 is 0 or not. When it is determined in S150 that the boom pilot pressure is not 0 (that is, when machine control is activated), the process proceeds to S160.

In S160, the target pilot pressure calculating section 43h determines whether the boom pilot pressure calculated in S140 is for boom raising or boom lowering. The target pilot pressure calculating section 43h then acquires the corrective value corresponding to the determination result from among the corrective values for boom raising and boom lowering stored on the corrective value storing section 43j and adds that corrective value to the boom pilot pressure calculated in S140. The process then proceeds to S170.

On the other hand, when it is determined in S150 that the boom pilot pressure is 0, machine-control-based boom control is not performed; thus, the process proceeds to S170 without a corrective value being added in S160.

In S170, the target pilot pressure calculating section 43h outputs to the solenoid proportional valve control section 44 a command for generating the arm pilot pressure of S120 (in the present embodiment, a command for fully opening the solenoid proportional valve 55c). Also, the target pilot pressure calculating section 43h outputs to the solenoid proportional valve control section 44 the boom pilot pressure of S160 when the process goes through S160 (that is, when machine control is activated) and 0 as the boom pilot pressure when the process does not go through S160 (that is, when machine control is not activated).

With this, the solenoid proportional valve 55c fully opens, the pilot pressure corresponding to the maximum arm crowding input amount acts on the driven unit 151a of the flow control valve 15b, and arm crowding operation is performed. When the process goes through S160, the solenoid proportional valve 54a or 54c opens, the boom pilot pressure of S160 is generated, and the boom is operated based machine control. By combining the boom operation and the arm crowding operation, the horizontal movement of the bucket claw tip along the target surface 60 is realized, and precise excavation along the target surface 60 is realized regardless of the operator's skills. On the other hand, when the process does not go through S160, the boom pilot pressure is 0; thus, only the arm crowding operation is performed.

In S180, the excavation operation determining section 43o determines whether an arm crowding operations is being input or not, based on the input amount input from the input amount calculating section 43a. When it is determined here that an arm crowding operations is being input (that is, the arm crowding operation is being continued), the process returns to S140, continuing the machine control. On the other hand, when it is determined that an arm crowding operation is not being input (that is, the arm crowding operation has ended), the process proceeds to S190.

In S190, the corrective value calculating section 43i determines whether or not topographic excavation has been performed by the bucket 10. As a method for the determination, there is one in which the presence and absence of changes in topography before and after the arm crowding operation are compared based on the measurement result of the topographic measurement device 96. Also, it is possible to adopt a method in which it is determined that topographic excavation has been performed when machine control was activated (that is, when the process goes through S160 and the boom pilot pressure is output to the solenoid proportional valve control section 44). When it is determined in S190 that excavation has been performed, the topographic information (topographic data) calculated by the topography calculating section 43m in S200 is input, and the process proceeds to S210. On the other hand, when it is determined in S190 that excavation has not been performed, the step of S110 and the subsequent processing is repeated after the next control cycle comes.

In S210, the corrective value calculating section 43i first calculates the distance to the target surface 60 for each of the multiple points forming the finished shape 97, based on the information of the target surface calculating section 43c on the target surface 60 and the topographic information of the topography calculating section 43m, and uses the average of the multiple distances calculated as the distance between the target surface 60 and the finished shape 97. The corrective value calculating section 43i next calculates corrective values of pilot pressures for boom raising and boom lowering based on the calculated distance between the target surface 60 and the finished shape 97 and the correlation between the distance and the boom pilot pressure (second control signal) defined in FIGS. 12 and 13, such that the finished shape gets closer to the target surface 60 and stores the calculation result on the corrective value storing section 43j.

For example, when the distance between the target surface 60 and the finished shape 97 is positive, it is the case where the finished shape 97 is located below the target surface 60, that is, the case of, what is called, over-excavation. In this case, a corrective value that increases the pilot pressure by boom raising and decreases the pilot pressure by boom lowering is calculated by the corrective value calculating section 43i. If the boom pilot pressure of S140 is corrected with such a corrective value, the trajectory depicted by the bucket claw tip moves to an upper position at the processing in the next S170 processing than before the correction, and over-excavation is prevented. Thus, it is possible to get the finished shape closer to the target surface 60. On the other hand, when the distance between the target surface 60 and the finished shape 97 is negative, it is the case where the finished shape 97 is located above the target surface 60, that is, there is, what is called, an unexcavated area. In this case, a corrective value that decreases the pilot pressure by boom raising and increased the pilot pressure by boom lowering is calculated by the corrective value calculating section 43i. If the boom pilot pressure is corrected with such a corrective value, the trajectory depicted by the claw tip moves to a lower position than before the correction, and the generation of an unexcavated area is prevented. Thus, it is possible to get the finished shape closer to the target surface 60.

When the processing of S210 has been completed, the processing of S110 and the subsequent processing is repeated after the next control cycle comes.

Effects

The following effects of the present embodiment are described. In the above embodiment, the hydraulic excavator 1 includes: the multi-joint work implement 1A having the boom 8, the arm 9, and the bucket 10; the boom cylinder 5, the arm cylinder 6, and the bucket cylinder 7 for driving the boom 8, the arm 9, and the bucket 10, respectively; the operating devices 45a, 45b, and 46a for outputting a control signal (first control signal) that matches the manual operation to at least one of the flow control valves 15a, 15b, and 15c of the hydraulic cylinders 5, 6, and 7; and the controller 40 having the target pilot pressure calculating section (control signal calculating section) 43h for newly generating, when the tip of the work implement 1A (bucket claw tip) is approaching the target surface 60 by the control signal (first control signal) output from the operating devices 45a, 45b, or 46a, a control signal (second control signal) that operates the boom cylinder 5 such that the tip of the work implement 1A moves along the target surface 60, the controller controlling the flow control valves 15a, 15b, and 15c of the boom cylinder 5, the arm cylinder 6, and the bucket cylinder 7 on the basis of the first control signal and the second control signal. The controller 40 further includes the topography calculating section 43m for calculating, based on the topographic information input from the topographic measurement device 96 that measures the nearby topography of the hydraulic excavator 1, the positional information of the finished shape 97 formed by the work implement 1A driven based on the second control signal, and the target pilot pressure calculating section 43h corrects the second control signal, based on the positional information of the finished shape 97, such that the finished shape 97 gets closer to the target surface 60. Also, in correcting the second control signal, in the present embodiment, the target pilot pressure calculating section 43h corrects the second control signal such that the difference between the positional information of the finished shape 97 and the positional information of the target surface 60 becomes smaller.

According to the above hydraulic excavator, each time excavation is performed, the control signal (second control signal) for the boom cylinder 5 (flow control valve 15a) is corrected such that the finished shape 97 gets closer to the target surface 60, and the difference in positional information between the finished shape 97 and the target surface 60 becomes smaller. Thus, even if the detection accuracy of the angle sensors 30, 31, and 32 is not sufficient, or even if the accuracy of controlling the tip of the work implement is not sufficient due to individual differences or aged deterioration, it is possible to perform excavation while moving the claw tip of the bucket 10 along the target surface 60. As a result, the construction accuracy of the target surface 60 can be enhanced.

Additional Notes

In the above, we have described the case where a control signal (second control signal) for the boom cylinder 5 is generated such that the bucket claw tip moves along the target surface 60 by machine control when the bucket claw tip approaches the target surface 60 during arm crowding operation. However, the control signal (second control signal) generated for the machine control is not limited to one for the boom cylinder 5, and a control signal (second control signal) can be generated for the arm cylinder 6 or the bucket cylinder 7. That is, as long as the bucket claw tip moves along the target surface 60, it is possible to generate at least one control signal for the boom cylinder 5, the arm cylinder 6, or the bucket cylinder 7 to control the work implement 1A. Needless to say, in that case, it is the control signal related to the hydraulic cylinder that has generated the control signal for the realization of machine control (that is, at least one of the hydraulic cylinders 5, 6, and 7) that calculates a corrective value.

In the above, the conditions for activating machine control are arm crowding operation by the operator and the intersecting point between the trajectory of the bucket claw tip and the target surface. However, boom lowering operation by the operator can also be added. In that case, when boom raising by machine control is required, the boom lowering pilot pressure by the manual operation is cancelled by closing the solenoid proportional valve 54b by the controller 40, and the required boom pilot pressure can be generated from the solenoid proportional valve 54a. Also, when boom lowering by machine control is required, for example, the boom lowering pilot pressure by the manual operation can be canceled in a similar manner, and the pilot pressure necessary for machine control can be generated from the solenoid proportional valve 54c. If the boom lowering pilot pressure necessary for machine control is smaller than the pilot pressure by the manual operation, the opening angle of the solenoid proportional valve 54b can be reduced in an appropriate manner to generate that necessary pilot pressure.

In the above, we have described the case where, in performing excavation based on machine control, boom raising and boom lowering are performed. However, the hydraulic excavator can perform only one of the boom raising and boom lowering.

EMBODIMENT 2

Embodiment 2 of the invention is described next. This embodiment has the same hardware structure as that of Embodiment 1 illustrated in FIGS. 1 to 4 and 6, and mainly the functions of the controller 40 differ from those in Embodiment 1. We describe mainly what is different from Embodiment 1.

Figure 15:
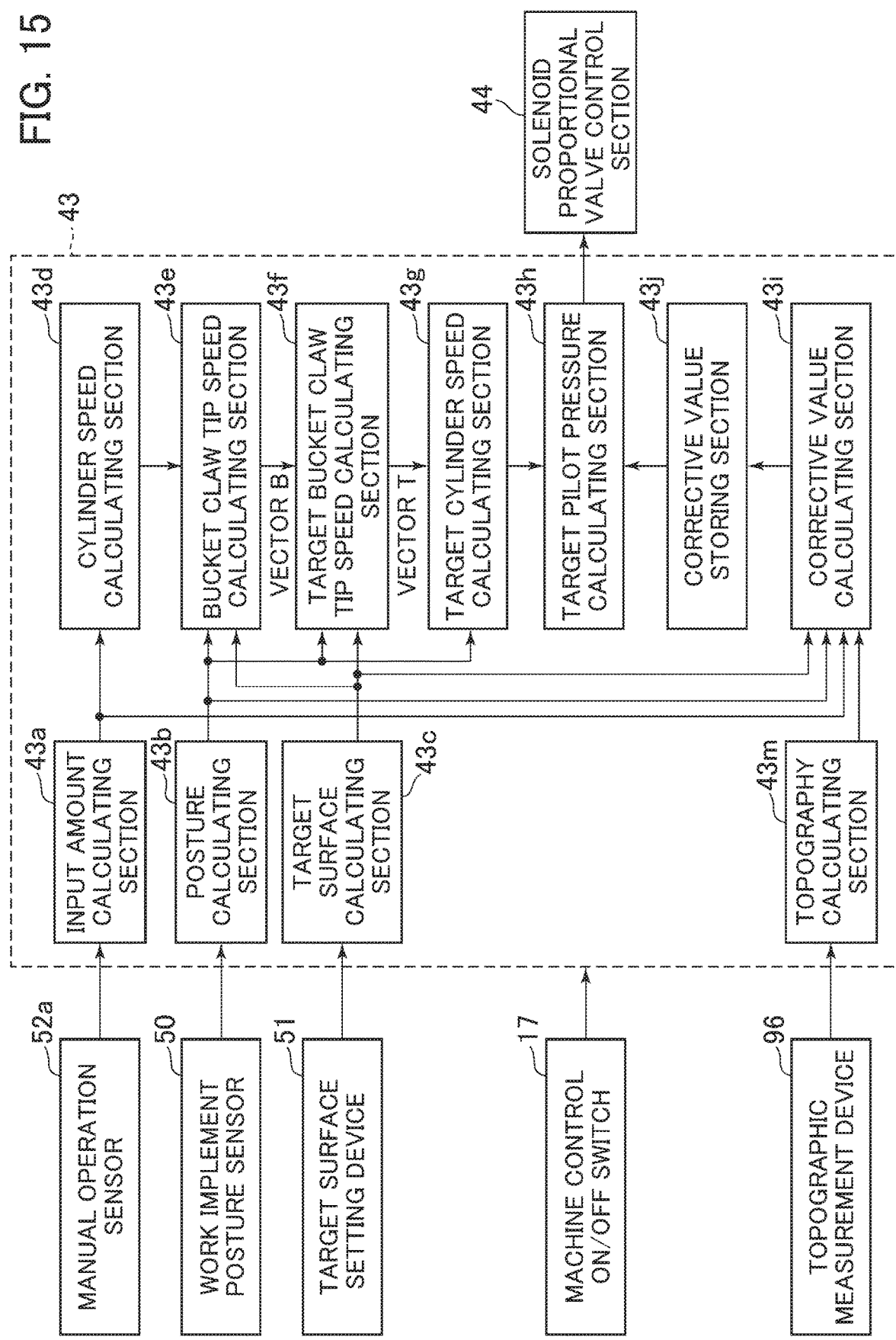
FIG. 15 is a functional block diagram of an area limiting control section 43 according to Embodiment 2.

FIG. 15 is a functional block diagram of the area limiting control section 43 of the present embodiment. The area limiting control section 43 includes the input amount calculating section 43a, the posture calculating section 43b, the target surface calculating section 43c, a cylinder speed calculating section 43d, a bucket tip speed calculating section 43e, a target bucket tip speed calculating section 43f, a target cylinder speed calculating section 43g, a target pilot pressure calculating section 43h, the topography calculating section 43m, the corrective value calculating section 43i, and the corrective value storing section 43j. Among these, the input amount calculating section 43a, the posture calculating section 43b, an the target surface calculating section 43c, the topography calculating section 43m, and the corrective value storing section 43j are the same as in Embodiment 1 and will not described.

The cylinder speed calculating section 43d calculates the operating speeds (cylinder speeds) of the hydraulic cylinders 5, 6, and 7 based on the input amount (first control signal) calculated by the input amount calculating section 43a. The operating speeds of the hydraulic cylinders 5, 6, and 7 can be calculated from the input amount calculated by the input amount calculating section 43a, the characteristics of the flow control valves 15a, 15b, and 15c, the cross-sectional areas of the hydraulic cylinders 5, 6, and 7, or the pump flow rate (discharge rate) obtained by multiplying the volume (tilt angle) of the hydraulic pump 2 and its rotational speed.

The bucket tip speed calculating section 43e calculates the speed vector B of the bucket tip (claw tip) by the manual operation (first control signal), based on the operating speeds of the hydraulic cylinders 5, 6, and 7 calculated by the cylinder speed calculating section 43d and the posture of the work implement 1A calculated by the posture calculating section 43b. The speed vector B of the bucket tip can be divided into the horizontal component bx and vertical component by with respect to the target surface 60, based on the information on the target surface 60 input from the target surface calculating section 43c.

The target bucket tip speed calculating section 43f calculates a target speed vector T for the bucket tip (claw tip). To do this, the target bucket tip speed calculating section 43f first calculates a limiting value ay for the component of the bucket tip speed vector vertical to the target surface 60, based on the distance D (see FIG. 5) between the bucket tip and the target surface 60 to be controlled and the graph of FIG. 16. The calculation of the limiting value ay can be done by storing a function or table defining the relation between the limiting value ay and the distance D such as the one illustrated in FIG. 16 on the ROM 93 of the controller 40 and reading the relation. The distance D can be calculated from the distance between the position (coordinates) of the claw tip of the bucket 10 calculated by the posture calculating section 43b and a straight line including the target surface 60 stored on the ROM 93. Although the relation between the limiting value ay and the distance D preferably has the characteristic that the limiting value ay decreases monotonously with increase in the distance D, it is not limited to the one illustrated in FIG. 16. For example, it is possible to maintain the limiting value ay at an predetermined individual value when the distance D is equal to or greater than a positive value or equal to or less than a negative value or define the relation between the limiting value ay an the distance D by a curve.

Figure 19:
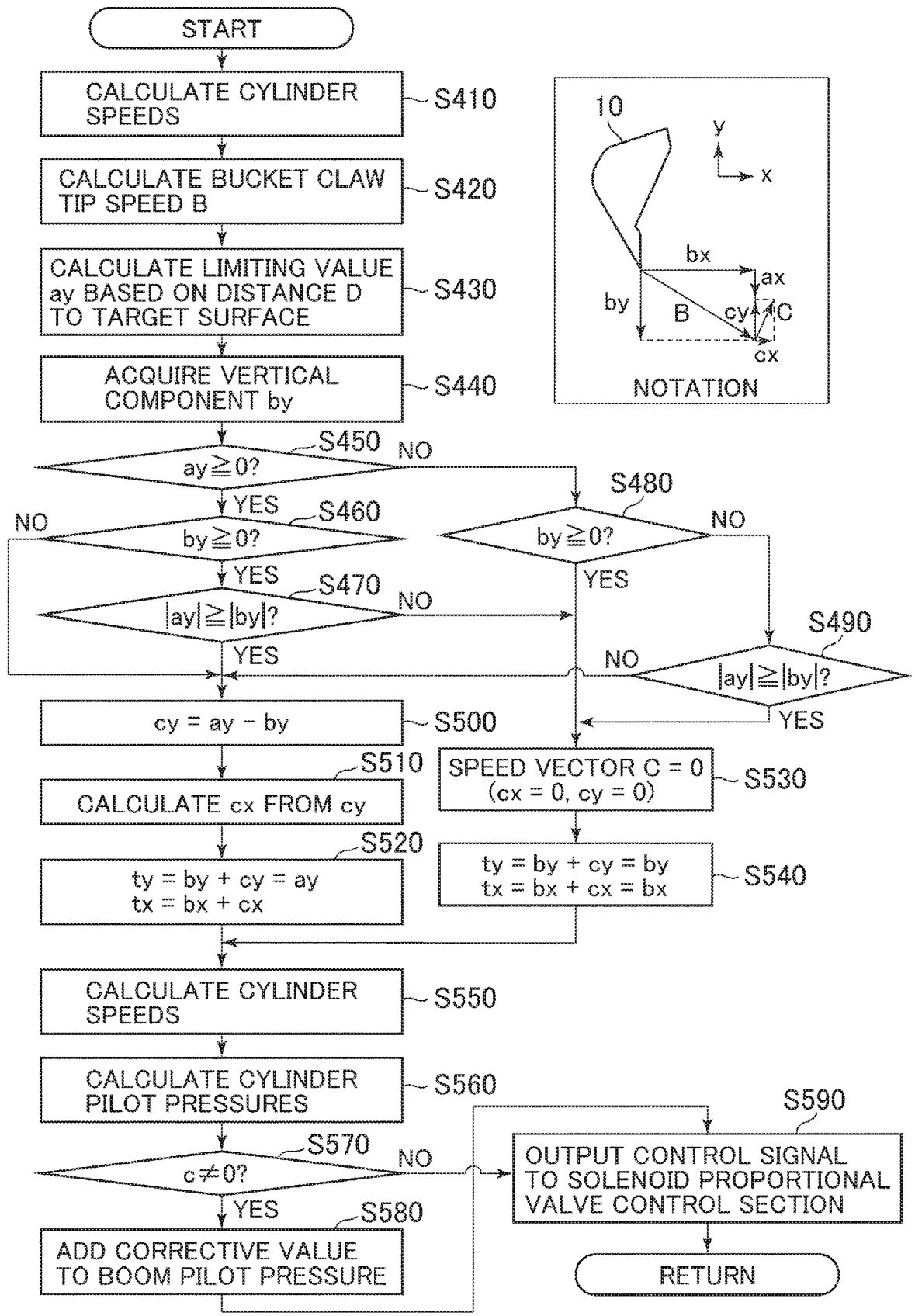
FIG. 19 is a flowchart illustrating the series of processing performed by the controller 40.

Next, the target bucket tip speed calculating section 43f acquires the component by of the bucket tip speed vector B vertical to the target surface 60 and selects, based on the magnitude relation between the vertical component by and the absolute value of the positive and negative values of the limiting value ay, the formula required to calculate the component cy of the bucket tip speed vector C vertical to the target surface 60, that is to be generated by the operation of the boom 8 by machine control (the selection process of the formula will be described with reference to FIG. 19). The target bucket tip speed calculating section 43f then calculates the vertical component cy from the selected formula to calculate the horizontal component cx from the operation permissible for the boom during the generation of the vertical component cy and also calculates the target speed vector T from the speed vectors B and C and the limiting value ay. In the explanation that follows, in the target speed vector T, the component vertical to the target surface 60 is ty, the horizontal component is tx, and FIG. 19 is also used to describe later the process of deriving the target vector T.

The target cylinder speed calculating section 43g calculates the target speeds for the hydraulic cylinders 5, 6, and 7 based on the target speed vector T (tx, ty) calculated by the target bucket tip speed calculating section 43f. In the present embodiment, because the target speed vector T is defined by the sum of the speed vector B by the manual operation and the speed vector C by machine control, the target speed for the boom cylinder 5 can be calculated from the speed vector C. With this, the target speed vector T of the bucket tip is the synthesized value of the speed vectors that appear at the tip of the bucket when the hydraulic cylinders 5, 6, and 7 are operated at the target speeds. When the vertical component cy of the speed vector C by machine control is zero, the target cylinder speed calculating section 43g calculates the target speeds for the hydraulic cylinders 5, 6, and 7 based on the bucket tip speed vector B calculated by the bucket tip speed calculating section 43e.

When the switch position of the machine control on/off switch 17 is the on position that indicates the active status of area limiting control, the target cylinder speed calculating section 43g outputs the above calculation result to the target pilot pressure calculating section 43h. However, when the switch position of the machine control on/off switch 17 is the off position that indicates the inactive status of area limiting control, the target cylinder speed calculating section 43g outputs the calculation result of the cylinder speed calculating section 43d to the target pilot pressure calculating section 43h.

Similar to Embodiment 1, the corrective value calculating section 43i is the part that calculates a corrective value for the boom pilot pressure (second control signal) when machine control is activated. However, the corrective value calculating section 43i of the present embodiment knows, based on the positional information on the trajectory along which the tip (bucket claw tip) of the work implement 1A has been moved by machine control (this positional information is input from the posture calculating section 43b) and the topographic information of the topography calculating section 43m, the vertical positional relation between the trajectory and the finished shape 97 in the same coordinate system and calculates a corrective value based on the distance between the trajectory and the finished shape 97. The 'trajectory' used herein is the trajectory of the bucket claw tip input from the posture calculating section 43b, for example, not the trajectory of the bucket claw tip measured in a coordinate system independent of the excavator coordinate system by a 3D laser scanner or the like, but the collection of positional information on the claw tip that controller 40 knows.

Figure 17:
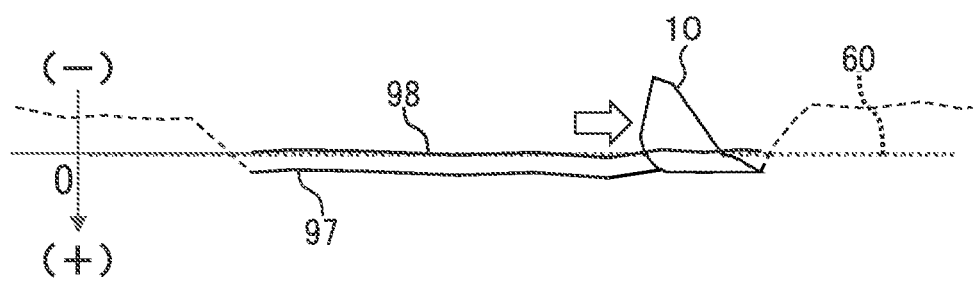
FIG. 17 illustrates an example of the target surface 60, the finished shape 97, and a trajectory 98.

FIG. 17 illustrates an example of the trajectory 98 of the bucket claw tip and the finished shape 97. The example of FIG. 17 schematically illustrates a case where, according to the calculation within the controller 40, the excavator was supposed to perform excavation along the trajectory 98 that runs along the target surface 60, but due to decreases in sensor accuracy or control accuracy, the finished shape 97 was formed below the target surface 60. The distance between the trajectory 98 and the finished shape 97 is the distance between the trajectory 98 and the finished shape 97 in a direction perpendicular to the target surface 60, and the position of the trajectory 98 is used as the reference (zero). Being below the trajectory 98 is positive while being above it is negative. Thus, in the case of FIG. 17, the distance between the trajectory 98 and the finished shape 97 is positive. Because the trajectory 98 and the finished shape 97 are typically formed by multiple points with different vertical distances from the target surface 60, in the present embodiment, the distance to the target surface 60 is calculated for each of the multiple points forming the trajectory 98 and the finished shape 97, and the average of the multiple distances calculated is used to identify the positions of the trajectory 98 and the finished shape 97 and calculate the distance between the trajectory 98 and the finished shape 97 from those positions. However, the calculation of the 'distance' between the target surface 60 and the finished shape 97 is not limited to this method, and it is possible to, for example, use the distance between any point selected from the multiple points forming the finished shape 97 and any point selected from the multiple points forming the trajectory 98 as the 'distance' or approximate the trajectory 98 and the finished shape 97 to straight lines parallel to the target surface 60 and use the distance between the two straight lines as the 'distance.'

By the way, in the present embodiment, due to processing based on the later-described flowchart of FIG. 19, only boom raising is performed by machine control, and boom lowering is not performed. Thus, the corrective value calculating section 43i of the present embodiment calculates a corrective value for the boom raising pilot pressure using the calculated distance between the trajectory 98 and the finished shape 97 and FIG. 12 and stores the calculated corrective value on the corrective value storing section 43j.

The target pilot pressure calculating section 43h calculates target pilot pressures for the flow control valves 15a, 15b, and 15c of the hydraulic cylinders 5, 6, and 7, based on the target speeds of the hydraulic cylinders 5, 6, and 7 calculated by the target cylinder speed calculating section 43g. Among these, the target pilot pressures of the arm cylinder 6 and the bucket cylinder 7 are output to the solenoid proportional valve control section 44 as they are. Regarding the rest, or the target pilot pressure of the boom cylinder 5, when its value is not zero (that is, when machine control is activated), the corrective value stored on the corrective value storing section 43j are referred to, and the boom pilot pressure obtained by adding the corrective value to the determined boom pilot pressure is used as the boom pilot pressure and output to the solenoid proportional valve control section 44.

The solenoid proportional valve control section 44 calculates commands for the solenoid proportional valves 54 to 56, based on the target pilot pressures of the flow control valves 15a, 15b, and 15c calculated by the target pilot pressure calculating section 43h. When the pilot pressure based on the manual operation (first control signal) and the target pilot pressures calculated by the target pilot pressure calculating section 43h are equal, the current values (command values) for the corresponding solenoid proportional valves 54 to 56 become zero, and the corresponding solenoid proportional valves 54 to 56 are not operated.

Operation

The operation of the above hydraulic excavator is described with reference to the flowcharts of FIGS. 18 and 19.

Figure 18:
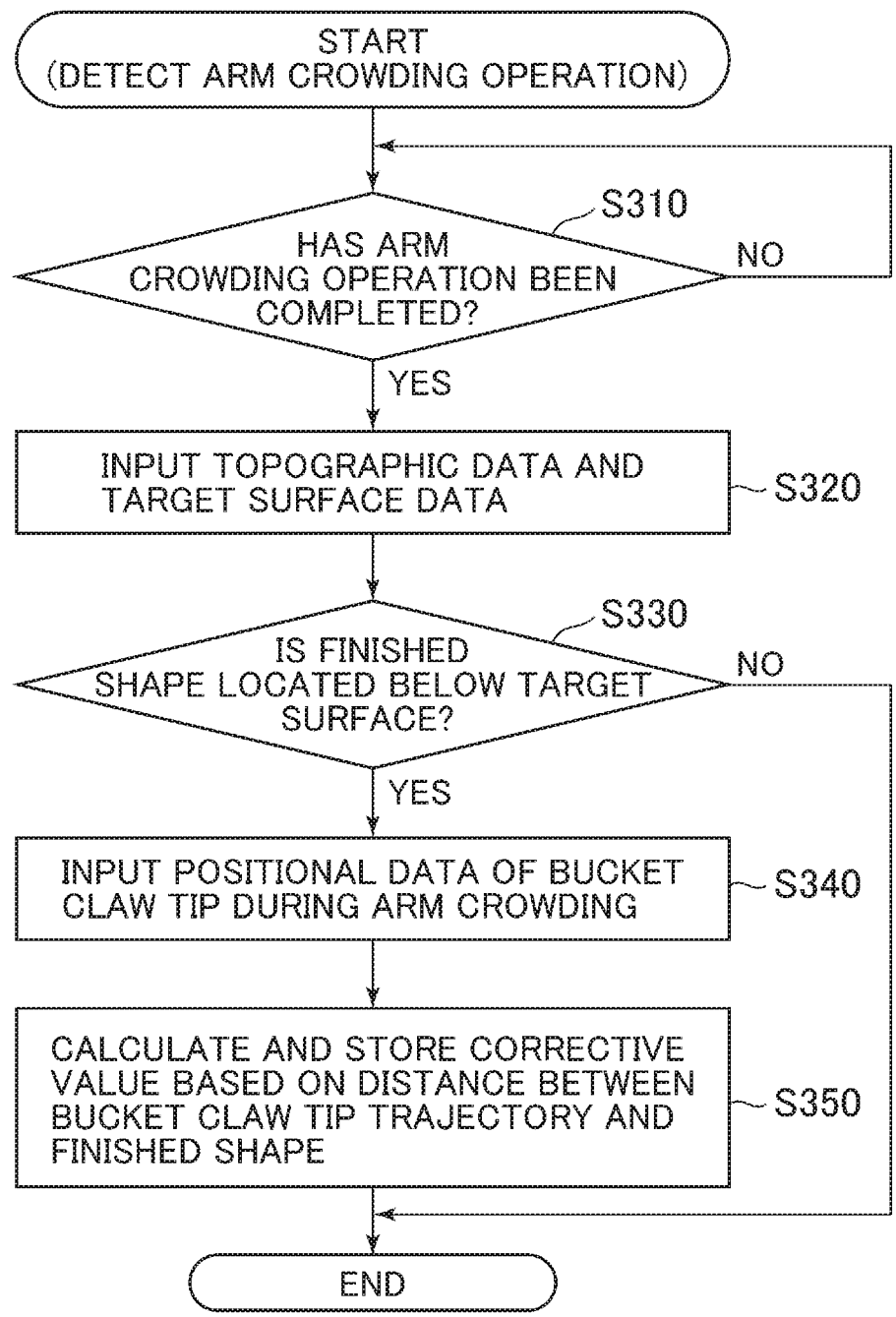
FIG. 18 is a flowchart illustrating the series of processing performed by a corrective value calculating section 43$i$.

FIG. 18 is a flowchart of the processing performed by the corrective value calculating section 43i. This flowchart is started when an arm crowding operation has been detected by the input amount calculating section 43a.

In S310, the corrective value calculating section 43i determines based on the input value from the input amount calculating section 43a whether or not the arm crowding operation has been completed. When it is determined that the arm crowding operation has been completed, the process proceeds to S320, where the topographic information calculated by the topography calculating section 43m and the information on the target surface 60 calculated by the target surface calculating section 43c are input. The process then proceeds to S330. On the other hand, when it is determined in S310 that the arm crowding operation is being continued, the processing of S310 is repeated.

In S330, the corrective value calculating section 43*i* determines, using the same coordinate system and based on the topographic information and the information on the target surface 60 input in S320, whether the finished shape 97 is located below the target surface 60 or not. The position of the finished shape 97 can be identified by the same method as that used for calculating the above-described distance between the trajectory 98 and the finished shape 97.

When it is determined in S330 that the finished shape 97 is located below the target surface 60, the process proceeds to S340. When it is determined that the finished shape 97 is located above the target surface 60, the processing ends and waits for the next start timing. The reason a corrective value is not calculated when the finished shape 97 is located above the target surface 60 is based on the ideas that due to the size or excavation power of the bucket 10, a single excavation operation does not necessarily result in the bucket digging up to the target surface 60 and that when the finished shape 97 is located above the target surface 60, it is difficult to determine the degree of accuracy.

In S340, the corrective value calculating section 43*i* acquires from the posture calculating section 43*b* the collection of positional data indicating the movement of the claw tip of the bucket 10 since the start of the flowchart until it is determined that the answer to S310 is yes and regards that collection of positional data as the trajectory of the claw tip of the bucket 10 for excavating (trajectory information).

In S350, the corrective value calculating section 43*i* first calculates the distance to the target surface 60 for each of the multiple points forming the finished shape 97 and the trajectory 98 in the same coordinate system, based on the information on the target surface 60 of the target surface calculating section 43*c*, the topographic information of the topography calculating section 43*m*, and the trajectory information of the posture calculating section 43*b*. It then identifies the positions of the finished shape 97 and the trajectory 98 from the average of the multiple distances calculated and calculates the distance from the trajectory 98 to the finished shape 97. The corrective value calculating section 43*i* next calculates a corrective value for the boom raising pilot pressure, based on the calculated distance between the trajectory 98 and the finished shape 97 and the correlation between the distance defined in FIG. 12 and the boom pilot pressure, and stores the result of calculations on the corrective value storing section 43*j*.

For example, when the distance between the trajectory 98 and the finished shape 97 is positive, it is the case where the finished shape 97 is located below the trajectory 98, that is, the case of, what is called, over-excavation. In this case, a corrective value that increases the pilot pressure by boom raising and decreases the pilot pressure by boom lowering is calculated by the corrective value calculating section 43*i*.

After the completion of storing processing of the corrective value on the corrective value storing section 43*j*, the series of processing of FIG. 18 end, causing the corrective value calculating section 43*i* to wait for the next detection of an arm crowding operation.

FIG. 19 is the flowchart of the processing performed by the controller 40. The controller 40 starts the flowchart of FIG. 19 when the manual operation is detected by the input amount calculating section 43*a*.

In S410, the cylinder speed calculating section 43*d* calculates the operating speeds (cylinder speeds) of the hydraulic cylinders 5, 6, and 7, based on the input amount calculated by the input amount calculating section 43*a*.

In S420, the bucket tip speed calculating section 43*e* calculates the speed vector B of the bucket tip (claw tip) by the manual operation, based on the operating speeds of the hydraulic cylinders 5, 6, and 7 calculated by the cylinder speed calculating section 43*d* and the posture of the work implement 1A calculated by the posture calculating section 43*b*.

In S430, the bucket tip speed calculating section 43*e* calculates the distance D from the bucket claw tip to the target surface 60 to be controlled (see FIG. 5), based on the position (coordinates) of the claw tip of the bucket 10 calculated by the posture calculating section 43*b* and the distance of a straight line including the target surface 60 stored on the ROM 93. It then calculates the limiting value ay for the component of the bucket claw tip speed vector vertical to the target surface 60, based on the distance D and the graph of FIG. 16.

In S440, the bucket tip speed calculating section 43*e* acquires the component by vertical to the target surface 60 in the bucket tip speed vector B by the manual operation calculated in S420.

In S450, the target bucket tip speed calculating section 43*f* determines whether the limiting value ay calculated in S430 is equal to or greater than 0 or not. The x and y coordinates are set as illustrated in FIG. 19. In the x and y coordinates, the x axis is parallel to the target surface 60 and the right direction in the figure is positive while the y axis is perpendicular to the target surface 60 and the left direction in the figure is negative. In the notation of FIG. 19, the vertical component by and the limiting value ay are negative while the horizontal component bx, horizontal component cx, and the vertical component cy are positive. As is obvious from FIG. 16, when the limiting ay is 0, the distance D is 0, that is, the claw tip is located on the target surface 60. When the limiting value ay is positive, the distance D is negative, that is, the claw tip is located below the target surface 60. When the limiting value ay is negative, the distance D is positive, that is, the claw tip is located above the target surface 60. When it is determined in S450 that the limiting value ay is equal to or greater than 0 (that is, when the claw tip is located on or below the target surface 60), the process proceeds to S460. When the limiting value ay is less than 0, the process proceeds to S480.

In S460, the target bucket tip speed calculating section 43*f* determines whether the vertical component by of the claw tip speed vector B by the manual operation is equal to or greater than 0 or not. When by is positive, the vertical component by of the speed vector B faces upward. When by is negative, the vertical component by of the speed vector B faces downward. When it is determined in S460 that the vertical component by is equal to or greater than 0 (that is, when the vertical component by faces upward), the process proceeds to S470. When the vertical component by is less than 0, the process proceeds to S500.

In S470, the target bucket tip speed calculating section 43*f* compares the absolute value of the limiting value ay and the absolute value of the vertical component by. When the absolute value of the limiting value ay is equal to or greater than the absolute value of the vertical component by, the process proceeds to S500. On the other hand, when the absolute value of the limiting value ay is less than the absolute value of the vertical component by, the process proceeds to S530.

In S500, the target bucket tip speed calculating section 43*f* selects 'cy=ay−by' as the formula to calculate the component cy of the bucket tip speed vector C vertical to the target surface 60 that is to be generated by the operation of the boom 8 by machine control and calculates the vertical component cy based on the formula, the limiting value ay of S430, and the vertical component by of S440. It then calculates the speed vector C capable of outputting the calculated vertical component cy and sets it horizontal component as cx (S510).

In S520, the target speed vector T is calculated. When the component of the target speed vector T vertical to the target surface 60 is ty and the component horizontal to the target surface 60 is tx, they can be represented as 'ty=by+cy, tx=bx+cx.' When the formula of S500 (cy=ay−by) is plugged into this, the target speed vector T becomes 'ty=ay, tx=bx+cx' after all. That is, the vertical component ty of the target speed vector when the process proceeds to S520 is limited to the limiting value ay, and machine-control-based forcible boom raising is activated.

In S480, the target bucket tip speed calculating section 43*f* determines whether the vertical component by of the claw tip speed vector B by the manual operation is equal to or greater than 0 or not. When it is determined in S480 that the vertical component by is equal to or greater than 0 (that is, when the vertical component by faces upward), the process proceeds to S530. When the vertical component by is less than 0, the process proceeds to S490.

In S490, the target bucket tip speed calculating section 43*f* compares the absolute value of the limiting value ay and the absolute value of the vertical component by. When the absolute value of the limiting value ay is equal to or greater than the absolute value of the vertical component by, the process proceeds to S530. On the other hand, when the absolute value of the limiting value ay is less than the absolute value of the vertical component by, the process proceeds to S500.

When the process proceeds to S530, there is no need to operate the boom 8 by machine control, and the target bucket tip speed calculating section 43*f* sets the speed vector C to 0. In this case, the target speed vector T becomes 'ty=by, tx=bx' based on the formula used in S520 (ty=by+cy, tx=bx+cx) and agrees with the speed vector B by the manual operation (S540).

We describe here the target speed vector T (ty, tx) when the processing of S450 through S540 are applied to the cases (1) through (4) of FIG. 20.

In the case of (1), because the bucket tip is located below the target surface 60, the distance D is negative, and the limiting value ay faces upward ((+) direction) from FIG. 16. The vertical component by of the speed vector B calculated by the calculating section 43*e* faces downward ((−) direction). Thus, since the route of the processing of S450, S460, and S500 is taken, the target speed vector T becomes 'ty=ay, tx=bx+cx.'

In the case of (2), because the bucket tip is located below the target surface 60, the distance D is negative, and the limiting value ay faces upward ((+) direction) from FIG. 16. The vertical component by faces upward ((+) direction). Thus, the rout of the processing of S450, S460, and S470 is taken. In S4470, the absolute value of the limiting value ay is compared against the absolute value of the vertical component by. When the absolute value of the limiting value ay is larger, the target speed vector T becomes 'ty=ay, tx=bx+cx (S500, 510, 520).' When the absolute value of the vertical component by is larger, the target speed vector T becomes 'ty=by, tx=bx (S530, 540).' That is, as the vertical component ty of the target vector T, the larger of the absolute values of the limiting value ay and the vertical component by is selected.

Figure 16:
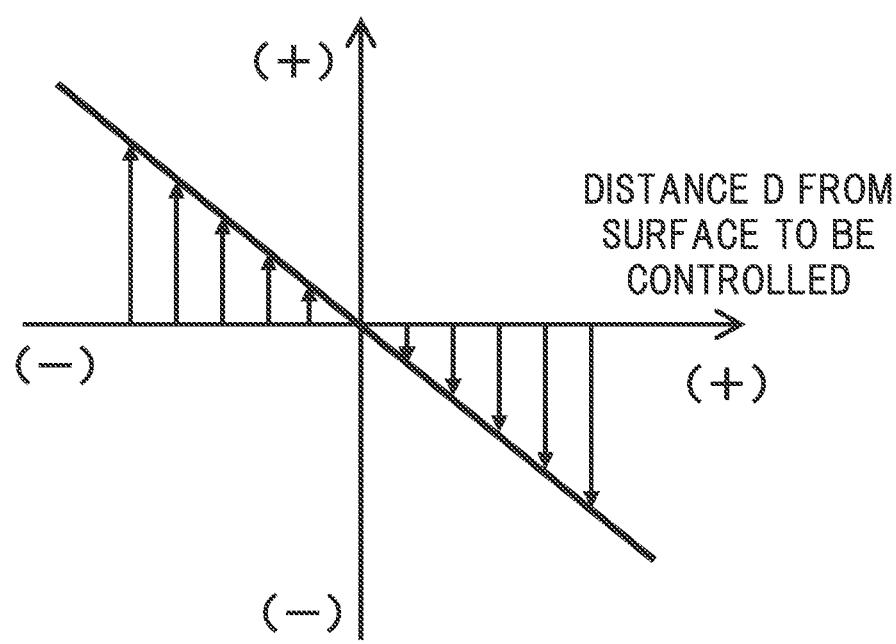
FIG. 16 illustrates the relation between a limiting value ay for the vertical component of bucket claw tip speed and a distance D.

In the case of (3), because the bucket tip is located above the target surface 60, the distance D is positive, and the limiting value ay faces downward ((−) direction) from FIG. 16. The vertical component by faces downward ((−) direction). Thus, the route of the processing of S450, S480, and S490 is taken. In S4490, the absolute value of the limiting value ay is compared against the absolute value of the vertical component by. When the absolute value of the limiting value ay is larger, the target speed vector T becomes 'ty=by, tx=bx (S530, 540, When the absolute value of the vertical component by is larger, the target speed vector T becomes 'ty=ay, tx=bx+cx) (S500, 510, 520).' That is, as the vertical component ty of the target vector T, the smaller of the absolute values of the limiting value ay and the vertical component by is selected.

In the case of (4), because the bucket claw tip is located above the target surface 60, the distance D is positive, and the limiting value ay faces downward ((−) direction) from FIG. 16. The vertical component by faces upward ((+) direction). Thus, the route of the processing of S450, S480, and S530 is taken, and the target speed vector T becomes 'ty=by, tx=bx.' For simplification purposes, when the answer to S480 is yes, the process is designed to proceed to S530. However, the process can proceed to S500 in place of S530. With this, forcible boom lowering is activated by machine control at a position beyond the point corresponding to point P3 of FIG. 9 during arm crowding operation, and excavation is performed along the target surface 60. As a result, the excavation distance along the target surface 60 can be extended. Needless to say, when correction is necessary when boom lowering is performed by machine control, the corrective value calculated using FIG. 13 is used as in Embodiment 1.

Referring back to FIG. 19, in S550, the target cylinder speed calculating section 43*g* calculates the target speeds of the hydraulic cylinders 5, 6, and 7 based on the target speed vector T (ty, tx) determined in S520 or S540.

In S560, the target pilot pressure calculating section 43*h* calculates the target pilot pressures of the flow control valves 15*a*, 15*b*, and 15*c* of the hydraulic cylinders 5, 6, and 7, based on the target speeds of the cylinders 5, 6, and 7 calculate in S550.

In S570, the target pilot pressure calculating section 43*h* determines whether the bucket tip speed vector C to be generated by the operation of the boom 8 by machine control is zero or not. When the speed vector C is not zero (that is, when machine control is activated), the process proceeds to S580. When the speed vector C is zero (that is, when machine control is not activated), the process proceeds to S590 without a corrective value being added in S580.

In S580, the target pilot pressure calculating section 43*h* acquires a corrective value for boom raising stored on the corrective value storing section 43*j* and adds the corrective value to the target pilot pressure of the flow control valve 15*a* of the boom cylinder 5. The process then proceeds to S590.

In S590, the target pilot pressure calculating section 43*h* outputs the target pilot pressures of the flow control valves 15*a*, 15*b*, and 15*c* of the hydraulic cylinders 5, 6, and 7 to the solenoid proportional valve control section 44. The solenoid proportional valve control section 44 controls the solenoid proportional valves 54, 55, and 56 such that the target pilot pressures act on the flow control valves 15*a*, 15*b*, and 15*c* of the hydraulic cylinders 5, 6, and 7. With this, the work implement 1A performs excavation. For example, when the distance between the trajectory 98 and the finished shape 97 is positive during the last excavation (that is, when the finished shape 97 is located below the trajectory 98, or when over-excavation occurs), the corrective value calculating section 43*i* calculates a corrective value that increases the pilot pressure by boom raising and decreases the pilot pressure by boom lowering, based on the flowchart of FIG. 18. When the thus-calculated corrective value is used to correct the boom pilot pressure calculated in S560 and activate machine control, the trajectory depicted by the claw tip moves to an upper position in the processing of S590 than in the last excavation, preventing over-excavation. As a result, it is possible to get the finished shape closer to the target surface 60.

When the processing of S590 ends, the target pilot pressure calculating section 43*h* is put on standby until the input amount calculating section 43*a* detects a lever operation by the operator.

Effects

The following effects of the present embodiment are described. In the present embodiment, the hydraulic excavator 1 includes: the multi-joint work implement 1A having the boom 8, the arm 9, and the bucket 10; the boom cylinder 5, the arm cylinder 6, and the bucket cylinder 7 for driving the boom 8, the arm 9, and the bucket 10, respectively; the operating devices 45*a*, 45*b*, and 46*a* for outputting a control signal (first control signal) that matches the manual operation to at least one of the flow control valves 15*a*, 15*b*, and 15*c* of the hydraulic cylinders 5, 6, and 7; and the controller 40 having the target pilot pressure calculating section (control signal calculating section) 43*h* for newly generating, when the tip of the work implement 1A (bucket claw tip) is approaching the target surface 60 by the control signal output from the operating devices 45*a*, 45*b*, or 46*a*, a control signal (second control signal) that operates the boom cylinder 5 such that the tip of the work implement 1A moves along the target surface 60, the controller controlling the flow control valves 15*a*, 15*b*, and 15*c* of the boom cylinder 5, the arm cylinder 6, and the bucket cylinder 7 based on the first control signal or the second control signal. The controller 40 further includes the topography calculating section 43*m* for calculating, based on the topographic information input from the topographic measurement device 96 that measures the nearby topography of the hydraulic excavator 1, the positional information of the finished shape 97 formed by the work implement 1A driven based on the second control signal and the posture calculating section 43*b* for calculating the positional information on the trajectory 98 along which the tip of the work implement 1A driven based on the second control signal moved, and the target pilot pressure calculating section 43*h* corrects the second control signal such that the difference between the positional information of the finished shape 97 and the positional information of the trajectory 98 becomes smaller.

According to the above hydraulic excavator, each time excavation is performed, the control signal (pilot pressure) for the boom cylinder 5 is corrected such that the finished shape 97 gets closer to the trajectory 98, and the difference in positional information between the finished shape 97 and the trajectory 98 becomes smaller. Thus, even if the detection accuracy of the angle sensors 30, 31, and 32 is not sufficient, or even if the accuracy of controlling the tip of the work implement is not sufficient due to individual differences or aged deterioration, it is possible to perform excavation while moving the claw tip of the bucket 10 along the target surface 60. As a result, the construction accuracy of the target surface 60 can be enhanced.

Additional Notes

In the hydraulic excavator having the area limiting control section 43 having the structure of FIG. 15, it is also possible to correct the second control signal, based on the distance between the finished shape 97 and the target surface 60 as in Embodiment 1.

In Embodiment 2, we have described an example in which the pilot pressure is corrected such that the finished shape 97 gets closer to the trajectory 98 near the target surface 60. When a displacement occurs between the trajectory 98 and the finished shape 97, it means that the coordinate system (excavator coordinate system) the controller 40 uses for the control of the claw tip (work implement 1A) is displaced from the coordinate system set on the ground (global coordinate system). Thus, it is also possible to correct the excavator coordinate system such that trajectory 98 gets closer to the finished shape 97.

Figure 21:
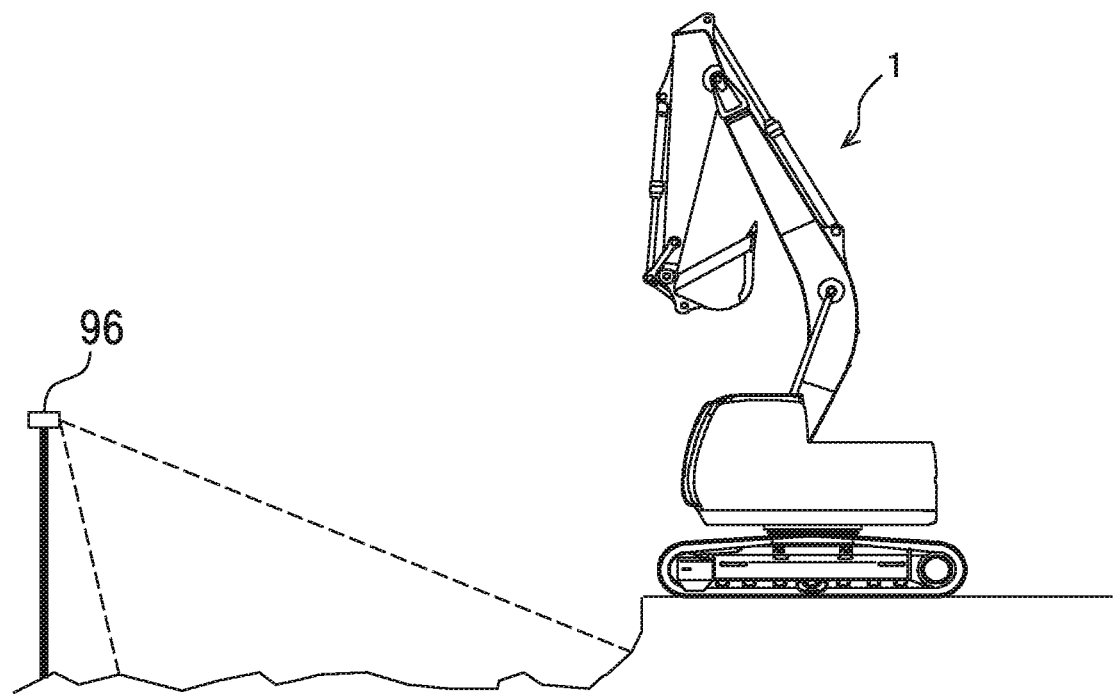
FIG. 21 is a diagram illustrating the installation position of a topographic measurement device 96 and its measurement range.
Figure 22:
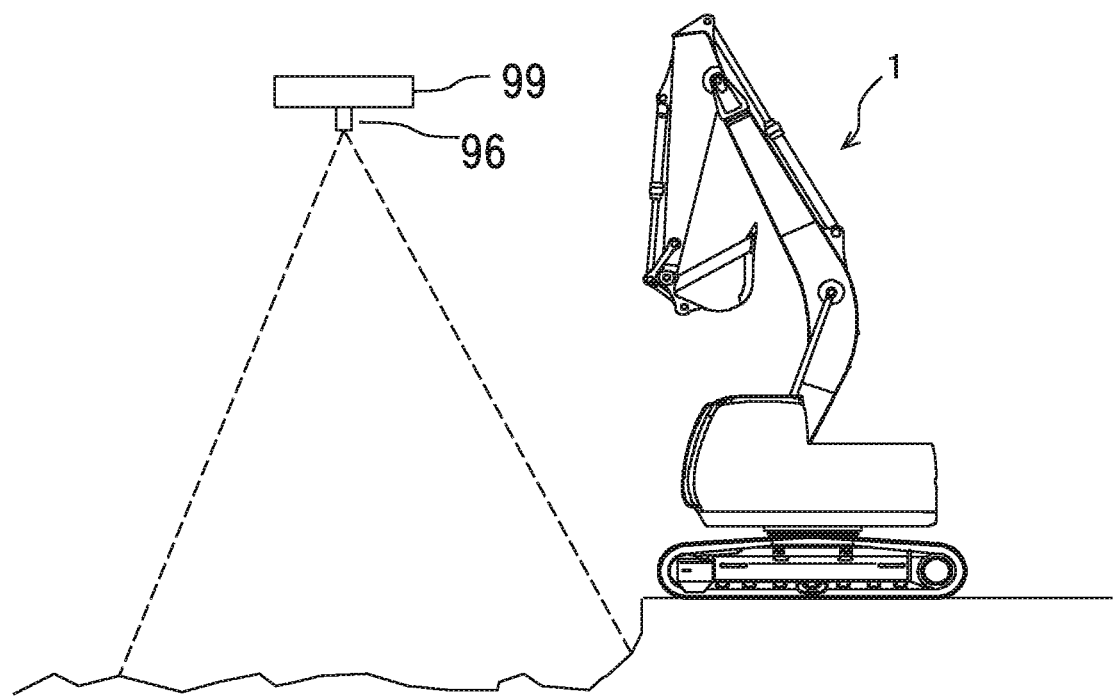
FIG. 22 is a diagram illustrating the installation position of a topographic measurement device 96 and its measurement range.

In the above two embodiments, the topographic measurement device 96 can be attached to the machine body 1B (hydraulic excavator 1) as illustrated in FIG. 1, can be installed separately outside the machine body 1B as illustrated in FIG. 21, or can be installed on a flying object 99 such as a drone as illustrated in FIG. 22. When it is not installed on the machine body 1B as in FIGS. 21 and 22, topographic information can be input to the controller 40 on the machine body 1B in a wireless or wired manner. When the topographic measurement device 96 is attached to the construction machine as in FIG. 1, the communication connection structure of the topographic measurement device 96 and the controller 40 is simpler. On the other hand, when the topographic measurement device 96 is independent of the construction machine as in FIGS. 21 and 22, the same topographic measurement device 96 can output topographic information to multiple construction machines.

While we have described the case where the distance and the corrective value are proportional as illustrated in FIGS. 12 and 13, it is also possible to set predetermined threshold values for the positive and negative sides with respect to zero without calculating the corrective value when the distance is close to zero and calculate the corrective value when the threshold values are exceeded. It is also possible to divide the distance into multiple sections and calculate a fixed corrective value for each section such that the corrective value increases or decreases in a staged manner. When the distance exceeds a predetermined threshold value, a predetermined corrective value can be calculated regardless the degree of deviation from the threshold value, and the calculated corrective value can be added to the sum of the corrective values obtained so far. In this case, for example, when a finished shape is located below the target surface 60 at a position where a threshold value is exceeded, 1 MPa is added as the boom raising pilot pressure corrective value of the 'predetermined corrective value,' and 1 MPa is subtracted as the boom lowering pilot pressure corrective value. With the above structure, it is possible to reduce the difference from the last control and stabilize control.

Further, in the above, we have described the method of increasing or decreasing the pilot pressure as the correction of boom control (machine control). However, when target pilot pressures are calculated form target cylinder speeds as in Embodiment 2 and, in calculating those, a conversion table is used to convert the target cylinder speeds into the target pilot pressures, it is also possible to increase or decrease the pilot pressure by changing the characteristics of the conversion table.

Further, it is possible to acquire the positional information of the target surface calculated by the target surface calculating section 43c and the positional information of each point on the ground calculated by the topography calculating section 43m from the excavator coordinate system or from the global coordinate system.

Moreover, in the above, while the operating devices 45, 46, and 47 are of the hydraulic pilot-operated type, it is possible to use the electric pilot-operated type that uses electric signals to control the flow control valves 15a, 15b, and 15c of the hydraulic cylinders 5, 6, and 7.

In the above, while corrective values are calculated each time excavation is performed, the timings of calculating corrective values are not particularly limited. Thus, for example, it is possible to calculate them before a day's work, after the work, at predetermined cycles, or during leveling work for excavating near the target surface (that is, during excavation).

Also, in the above, while the claw tip of the bucket 10 is selected as the reference for the control of the work implement 1A (control point), a point on the bucket 10 or a point on the work implement 1A near the bucket can also be used.

Further, in the above, while the area limiting control section 43 within the controller 40 is installed on the hydraulic excavator 1, it is possible to separate the area limiting control section 43 from the hydraulic excavator 1, input input data from the manual operation sensor 52a or the like in a wireless or wired manner, and output the result of calculation from the input data (target pilot pressure for the hydraulic cylinders 5, 6, and 7) to the solenoid proportional valve control section 44 in a wired or wireless manner. In this case, the area limiting control section 43 can be formed of a single computer or multiple computers.

The invention is not limited to the embodiments described above but allows various modifications without departing from the scope of the invention. The invention does not necessarily need to have all the components used in the embodiments, but some components can be removed therefrom. Some components of an embodiment can be added to another embodiment or replaced by some components of another.

The elements related to the controller 40 and the functions and processing performed by them can be implemented partially or entirely by hardware (for example, the logic executing a function is implemented by an integrated circuit). Also, the elements related to the controller 40 can be implemented by programs (software) that execute the functions of the elements of the controller 40 by being read by a calculation processing unit (CPU, for example). The information related the programs can be stored on, for example, semiconductor memories (flash memories, SSDs, or the like), magnetic recording devices (hard disk drives or the like), or recording media (magnetic disks, optical disks, or the like).

DESCRIPTION OF REFERENCE CHARACTERS

1A: Front work implement
8: Boom
9: Arm
10: Bucket
17: Machine control on/off switch
30: Boom angle sensor
31: Arm angle sensor
32: Bucket angle sensor
40: Controller
43: Area limiting control section
43a: Input amount calculating section
43b: Posture calculating section
43c: Target surface calculating section
43d: Cylinder speed calculating section
43e: Bucket tip speed calculating section
43f: Target bucket tip speed calculating section
43g: Target cylinder speed calculating section
43h: Target pilot pressure calculating section
43i: Corrective value calculating section
43j: Corrective value storing section
43m: Topography calculating section
43n: Arm-angle-specific boom pilot pressure calculating section
44: Solenoid proportional valve control section
45: Operating devices (boom, arm)
46: Operating devices (bucket, swing)
47: Operating device (travel)
50: Work implement posture sensor
51: Target surface setting device
52a, 52b: Manual operation sensor
54, 55, 56: Solenoid proportional valve
96: Topographic measurement device
97: Finished shape
98: Trajectory of bucket tip

The invention claimed is:

1. A work machine comprising:
a multi-joint work implement including a boom and an arm;
a boom cylinder and an arm cylinder for driving the boom and the arm, respectively;
an operating device for outputting a first control signal that matches an input amount by an operator to a flow control valve of the arm cylinder; and
a controller configured to calculate a second control signal, the second control signal being used to operate the boom cylinder such that when a tip of the work implement is approaching a target surface based on the first control signal, the tip of the work implement moves along the target surface, the controller configured to control the flow control valve of the arm cylinder based on the second control signal thereby raising and lowering the boom,
wherein the controller:
calculates, based on topographic information input from a topographic measurement device that measures topography near the work implement, positional information of a finished shape formed by the work implement based upon an arm crowding operation being not performed,
calculates a first corrective value for the second control signal, based upon a height of the finished shape being lower than the target surface, that increases pilot pressures for boom raising and decreases pilot pressures for boom lowering,
calculates a second corrective value for the second control signal, based upon the height of the finished shape being higher than the target surface, that decreases pilot pressures for boom raising and increases pilot pressures for boom lowering, and
corrects the second control signal by using the first corrective value or the second corrective value.

2. The work machine of claim 1, wherein
the second control signal for boom raising is corrected such that the second control signal increases with an increase in the distance between the target surface and the finished shape, and
the second control signal for boom lowering is corrected such that the second control signal decreases with an increase in the distance between the target surface and the finished shape.

3. The work machine of claim 1, wherein the controller calculates positional information of a trajectory along which the tip of the work implement driven by the second control signal has been moved, and
the controller corrects the second control signal such that a difference between the positional information of the finished shape and the positional information of the trajectory becomes small.

4. The work machine of claim 1, wherein
the topographic measurement device is installed on the work machine.

5. The work machine of claim 1, wherein
the topographic measurement device is provided separately from the work machine; and
the topographic information measured by the topographic measurement device is input to the controller of the work machine in a wireless or wired manner.

* * * * *